(12) United States Patent
Smith

(10) Patent No.: US 11,964,702 B2
(45) Date of Patent: Apr. 23, 2024

(54) VEHICLE RACK ASSEMBLY

(71) Applicant: Lund Motion Products, Inc., Ann Arbor, MI (US)

(72) Inventor: Anthony Smith, Costa Mesa, CA (US)

(73) Assignee: Lund Motion Products, Inc., Ann Arbor, MI (US)

( * ) Notice: Subject to any disclaimer, the term of this patent is extended or adjusted under 35 U.S.C. 154(b) by 0 days.

(21) Appl. No.: 18/299,357

(22) Filed: Apr. 12, 2023

(65) Prior Publication Data

US 2023/0303189 A1 Sep. 28, 2023

Related U.S. Application Data

(63) Continuation of application No. 17/087,398, filed on Nov. 2, 2020, now Pat. No. 11,654,978.

(60) Provisional application No. 62/930,397, filed on Nov. 4, 2019.

(51) Int. Cl.
*B62D 33/02* (2006.01)
*B60R 9/06* (2006.01)

(52) U.S. Cl.
CPC ............ *B62D 33/0207* (2013.01); *B60R 9/06* (2013.01)

(58) Field of Classification Search
CPC .............................. B62D 33/0207; B60R 9/06
See application file for complete search history.

(56) References Cited

U.S. PATENT DOCUMENTS

| | | | |
|---|---|---|---|
| 171,736 A | 1/1876 | Mooney | |
| 309,767 A | 12/1884 | Clarke | |
| 341,307 A | 5/1886 | Altschwager | |
| 540,707 A | 6/1895 | Wolf | |
| 600,898 A | 3/1898 | Smith | |
| 1,127,854 A | 2/1915 | Belankski | |

(Continued)

FOREIGN PATENT DOCUMENTS

CN 108791034 11/2018
CN 109230011 1/2019
(Continued)

OTHER PUBLICATIONS

Features Comparison. Roll-N-Lock E-Series vs. Pace Edwards Bedlocker. http://rollnlock.com/wp-content/uploads/2013/07/FeatureComparison_E-Series_Eng1.pdf.

(Continued)

*Primary Examiner* — Brian D Nash
(74) *Attorney, Agent, or Firm* — Knobbe Martens Olson & Bear LLP

(57) ABSTRACT

A rack assembly configured to mount to sidewalls of a truck bed can include a pair of side rails defining a support surface positionable over the sidewalls and at least one cross rail having a first end, a second end, a first length extending between the first and second ends, and one or more channels extending along a portion of the first length. In some embodiments, each of the pair of side rails includes at least a first mounting station. In some embodiments, each of the first and second ends of the at least one cross rail can secure to one of the first mounting stations of the pair of side rails such that, when the at least one cross rail is secured to the pair of side rails at the first mounting stations, the at least one cross rail is transverse with respect to the pair of side rails.

20 Claims, 19 Drawing Sheets

(56) References Cited

U.S. PATENT DOCUMENTS

| | | |
|---|---|---|
| 1,214,600 A | 2/1917 | Silverthorne |
| 1,242,035 A | 10/1917 | Pierson et al. |
| 1,266,521 A | 5/1918 | Norquist |
| 1,272,620 A | 7/1918 | Carlson |
| 1,289,997 A | 12/1918 | Wyeth |
| 1,655,777 A | 1/1928 | Weiland |
| 1,655,797 A | 1/1928 | Peck |
| 1,764,615 A | 6/1930 | Edwards |
| 1,812,580 A | 6/1931 | Black |
| 1,930,841 A | 10/1933 | Miniere |
| 2,067,994 A | 1/1937 | Thwaits |
| 2,483,947 A | 10/1949 | Turner |
| 2,514,466 A | 7/1950 | Bildhauer |
| D160,213 S | 9/1950 | Samuelson |
| 2,530,365 A | 11/1950 | Johnson et al. |
| 2,621,357 A | 12/1952 | Stuman |
| 2,626,179 A | 1/1953 | Gonzalez |
| 2,663,447 A | 12/1953 | Westcott |
| RE23,814 E | 4/1954 | Ingram |
| 2,713,897 A | 7/1955 | Teague et al. |
| 2,720,414 A | 10/1955 | Hart |
| 2,795,363 A | 6/1957 | Turner |
| 2,795,383 A | 6/1957 | Turner |
| 2,797,959 A | 7/1957 | Brice |
| 2,872,239 A | 2/1959 | Bowness et al. |
| 2,874,885 A | 2/1959 | Young |
| 3,148,724 A | 9/1964 | Chieger et al. |
| 3,329,385 A | 7/1967 | Dietsch |
| 3,357,670 A | 12/1967 | Larson et al. |
| 3,656,801 A | 4/1972 | Doutt et al. |
| 3,675,959 A | 7/1972 | Hansen et al. |
| 3,734,560 A | 5/1973 | Cramblet |
| 3,773,143 A | 11/1973 | Del Prete et al. |
| 3,902,599 A | 9/1975 | Stromberg |
| 4,023,850 A | 5/1977 | Tillery |
| 4,063,774 A | 12/1977 | Hanks |
| 4,132,335 A | 1/1979 | Ingram |
| 4,136,905 A | 1/1979 | Morgan |
| 4,145,044 A | 3/1979 | Wilson et al. |
| 4,270,681 A | 6/1981 | Ingram |
| 4,295,587 A | 10/1981 | Bott |
| D266,836 S | 11/1982 | Ingram |
| D267,247 S | 12/1982 | Kowalski et al. |
| 4,419,794 A | 12/1983 | Horton, Jr. et al. |
| 4,444,427 A | 4/1984 | Martin |
| 4,451,075 A | 5/1984 | Canfield |
| 4,470,716 A | 9/1984 | Welch |
| 4,472,639 A | 9/1984 | Bianchi |
| 4,531,773 A | 7/1985 | Smith |
| 4,585,263 A | 4/1986 | Hesner |
| 4,592,529 A | 6/1986 | Suzuki |
| 4,596,174 A | 6/1986 | Bennett |
| 4,596,417 A | 6/1986 | Bennett |
| 4,635,992 A | 1/1987 | Hamilton |
| 4,650,144 A | 3/1987 | ConraD |
| 4,652,035 A | 3/1987 | Austin, Jr. |
| 4,659,136 A | 4/1987 | Martin et al. |
| D291,789 S | 9/1987 | Noga |
| D294,137 S | 2/1988 | Robson |
| 4,749,226 A | 6/1988 | Heft |
| 4,750,773 A | 6/1988 | Chapline |
| 4,770,458 A | 9/1988 | Burke et al. |
| 4,778,213 A | 10/1988 | Palmer |
| 4,786,099 A | 11/1988 | Mount |
| 4,786,119 A | 11/1988 | Smuda |
| 4,793,397 A | 12/1988 | Whiteman |
| 4,795,206 A | 1/1989 | Adams et al. |
| D300,734 S | 4/1989 | Kruitbosch |
| 4,824,158 A | 4/1989 | Peters et al. |
| 4,828,312 A | 5/1989 | Kinkel |
| 4,830,242 A | 5/1989 | Painter |
| 4,850,770 A | 7/1989 | Millar, Jr. |
| 4,860,495 A | 8/1989 | Kessler |
| 4,875,724 A | 10/1989 | Gruber |
| D305,111 S | 12/1989 | Zagner |
| 4,884,317 A | 12/1989 | Liu |
| D308,627 S | 6/1990 | Guffey |
| 4,953,820 A | 9/1990 | Yoder |
| 4,961,677 A | 10/1990 | Downard, Jr. |
| 5,005,892 A | 4/1991 | Haugen et al. |
| 5,011,349 A | 4/1991 | McAndrews |
| 5,024,409 A | 6/1991 | Bohnen |
| 5,037,152 A | 8/1991 | Hendricks |
| 5,037,153 A | 8/1991 | Stark |
| 5,040,843 A | 8/1991 | Russell et al. |
| D321,496 S | 11/1991 | Sparham et al. |
| 5,083,829 A | 1/1992 | Fonseca |
| D326,076 S | 5/1992 | Wiese |
| 5,114,203 A | 5/1992 | Carnes |
| 5,121,960 A | 6/1992 | Wheatley |
| 5,123,691 A | 6/1992 | Ginn |
| 5,127,697 A | 7/1992 | St. Marie |
| 5,129,665 A | 7/1992 | Sutter et al. |
| 5,139,375 A | 8/1992 | Franchuk |
| 5,147,103 A | 9/1992 | Ducote |
| 5,154,470 A | 10/1992 | Bringman, Jr. |
| 5,169,200 A | 12/1992 | Pugh |
| 5,170,746 A | 12/1992 | Roose |
| 5,201,532 A | 4/1993 | Salesky et al. |
| 5,201,562 A | 4/1993 | Dorsey |
| D337,934 S | 8/1993 | Young |
| 5,234,122 A | 8/1993 | Cherng |
| 5,251,950 A | 10/1993 | Bernardo |
| 5,253,913 A | 10/1993 | Metivier |
| 5,275,458 A | 1/1994 | Barben et al. |
| 5,299,773 A | 4/1994 | Bertrand |
| 5,301,913 A | 4/1994 | Wheatley |
| 5,310,155 A | 5/1994 | Wu |
| 5,310,238 A | 5/1994 | Wheatley |
| 5,330,246 A | 7/1994 | Bernardo |
| 5,357,376 A | 10/1994 | Yoshida |
| 5,380,141 A | 1/1995 | Flowers |
| 5,385,377 A | 1/1995 | Girard |
| 5,396,915 A | 3/1995 | Bomar |
| 5,417,340 A | 5/1995 | Anthony |
| 5,421,633 A | 6/1995 | Moore et al. |
| D360,614 S | 7/1995 | Alcocer |
| 5,441,324 A | 8/1995 | Gold |
| 5,443,190 A | 8/1995 | Cucheran et al. |
| 5,443,341 A | 8/1995 | Hamilton |
| 5,456,511 A | 10/1995 | Webber |
| 5,460,393 A | 10/1995 | Tsai |
| 5,460,423 A | 10/1995 | Kersting et al. |
| 5,468,038 A | 11/1995 | Sauri |
| D365,323 S | 12/1995 | Napierkowski et al. |
| 5,487,585 A | 1/1996 | Wheatley |
| 5,494,327 A | 2/1996 | Derecktor |
| 5,500,983 A | 3/1996 | Lautenschlager |
| 5,522,635 A | 6/1996 | Downey |
| 5,540,475 A | 7/1996 | Kersting |
| 5,573,161 A | 11/1996 | Stapleton |
| 5,579,970 A | 12/1996 | Cucheran et al. |
| 5,588,630 A | 12/1996 | Chen-Chao |
| 5,622,296 A | 4/1997 | Pirhonen et al. |
| 5,636,893 A | 6/1997 | Wheatley et al. |
| 5,655,808 A | 8/1997 | Wheatley |
| 5,658,033 A | 8/1997 | Delaune |
| 5,673,958 A | 10/1997 | Gramss |
| 5,685,686 A | 11/1997 | Burns |
| 5,700,047 A | 12/1997 | Leitner et al. |
| 5,730,342 A | 3/1998 | Tien |
| 5,741,038 A * | 4/1998 | Fowler .................. B60P 3/40 |
| | | 296/3 |
| 5,743,589 A | 4/1998 | Felker |
| D394,639 S | 5/1998 | Carter |
| 5,752,800 A | 5/1998 | Brincks et al. |
| 5,755,480 A | 5/1998 | Bryan |
| 5,765,892 A | 6/1998 | Covington |
| 5,772,062 A | 6/1998 | Gramss |
| 5,775,759 A | 7/1998 | Cummings |
| 5,782,282 A | 7/1998 | Chen |
| 5,788,311 A | 8/1998 | Tibbals |
| D398,284 S | 9/1998 | Carter et al. |
| 5,806,907 A | 9/1998 | Martinus et al. |

(56) References Cited

U.S. PATENT DOCUMENTS

| | | | |
|---|---|---|---|
| D399,481 S | 10/1998 | Larson et al. | |
| 5,816,637 A | 10/1998 | Adams et al. | |
| 5,820,188 A | 10/1998 | Nash | |
| 5,823,596 A | 10/1998 | Kulesza | |
| 5,839,614 A | 11/1998 | Brown | |
| 5,853,116 A | 12/1998 | Schreiner | |
| 5,857,724 A | 1/1999 | Jarman | |
| 5,857,729 A | 1/1999 | Bogard | |
| 5,862,964 A | 1/1999 | Moliner | |
| 5,871,316 A * | 2/1999 | Bills | B60P 7/0823 410/97 |
| 5,873,688 A | 2/1999 | Wheatley | |
| 5,893,500 A | 4/1999 | Cucheran et al. | |
| D410,429 S | 6/1999 | Derecktor | |
| 5,911,464 A | 6/1999 | White | |
| 5,913,465 A | 6/1999 | Potter et al. | |
| 5,921,603 A * | 7/1999 | Karrer | B60P 7/15 296/100.18 |
| 5,924,614 A | 7/1999 | Kuntze et al. | |
| 5,924,753 A | 7/1999 | DiBassie | |
| 5,951,092 A * | 9/1999 | Cissell | B60J 7/102 296/100.18 |
| 5,975,618 A | 11/1999 | Rippberger | |
| 5,984,379 A | 11/1999 | Michel et al. | |
| D417,859 S | 12/1999 | Leitner et al. | |
| D418,106 S | 12/1999 | Leitner et al. | |
| 5,997,066 A | 12/1999 | Scott | |
| 6,019,410 A | 2/2000 | Trostle et al. | |
| 6,024,401 A | 2/2000 | Wheatley et al. | |
| 6,024,402 A | 2/2000 | Wheatley | |
| 6,039,520 A | 3/2000 | Cheng | |
| 6,053,557 A | 4/2000 | Kooiker | |
| 6,053,558 A | 4/2000 | Weldy et al. | |
| 6,059,159 A | 5/2000 | Fisher | |
| 6,076,881 A | 6/2000 | Tucker | |
| 6,082,801 A | 7/2000 | Owen et al. | |
| 6,092,263 A | 7/2000 | Boue et al. | |
| 6,102,265 A | 8/2000 | Stapleton | |
| 6,112,964 A | 9/2000 | Cucheran et al. | |
| 6,112,965 A | 9/2000 | Lundgren | |
| 6,113,173 A | 9/2000 | Leitner et al. | |
| 6,113,176 A | 9/2000 | Bernardo | |
| 6,113,328 A | 9/2000 | Claucherty | |
| 6,120,076 A | 9/2000 | Adsit et al. | |
| 6,123,305 A | 9/2000 | LukasavitZ | |
| 6,129,490 A | 10/2000 | Erskine | |
| 6,149,219 A | 11/2000 | Schambre et al. | |
| 6,149,220 A | 11/2000 | Weldy et al. | |
| 6,227,593 B1 | 5/2001 | De Valcourt | |
| 6,227,602 B1 | 5/2001 | Bogard | |
| 6,238,153 B1 | 5/2001 | Karrer | |
| 6,256,844 B1 | 7/2001 | Wheatley | |
| 6,257,637 B1 | 7/2001 | Reed | |
| 6,264,266 B1 | 7/2001 | Rusu et al. | |
| 6,269,990 B1 | 8/2001 | Gray | |
| 6,273,491 B1 | 8/2001 | Bath et al. | |
| 6,276,735 B1 | 8/2001 | Champion | |
| 6,283,525 B1 | 9/2001 | Morse | |
| 6,338,515 B1 | 1/2002 | Munhall | |
| 6,340,190 B1 | 1/2002 | Rosebrugh et al. | |
| 6,340,194 B1 | 1/2002 | Muirhead et al. | |
| 6,350,089 B1 | 2/2002 | Tekavec | |
| 6,352,295 B1 | 3/2002 | Leitner | |
| 6,378,926 B1 | 4/2002 | Renze et al. | |
| 6,390,427 B1 | 5/2002 | McConnell et al. | |
| 6,402,215 B1 | 6/2002 | Leitner et al. | |
| 6,422,627 B1 | 7/2002 | Kuhn et al. | |
| 6,425,618 B1 | 7/2002 | Garland et al. | |
| 6,454,338 B1 | 9/2002 | Glickman et al. | |
| 6,471,277 B1 | 10/2002 | Scensny et al. | |
| 6,488,249 B1 | 12/2002 | Girardi et al. | |
| 6,494,520 B2 | 12/2002 | Brzenchek et al. | |
| 6,499,791 B2 | 12/2002 | Wheatley | |
| 6,511,272 B2 * | 1/2003 | Stafford | B60P 7/15 410/121 |
| 6,513,688 B2 | 2/2003 | Kmita et al. | |
| 6,540,123 B1 | 4/2003 | Kmita et al. | |
| 6,543,836 B1 | 4/2003 | Wheatley | |
| 6,550,841 B1 | 4/2003 | Burdon et al. | |
| 6,557,918 B2 | 5/2003 | Iafrate et al. | |
| 6,561,560 B2 | 5/2003 | Brown et al. | |
| 6,568,740 B1 | 5/2003 | Dimmer | |
| 6,575,520 B1 | 6/2003 | Spencer | |
| 6,585,465 B1 | 7/2003 | Hammond et al. | |
| 6,598,922 B2 | 7/2003 | Morse et al. | |
| 6,604,898 B2 | 8/2003 | Price | |
| 6,607,228 B2 | 8/2003 | Carter, III et al. | |
| 6,626,478 B1 | 9/2003 | Minton | |
| 6,637,707 B1 | 10/2003 | Gates et al. | |
| D485,800 S | 1/2004 | Smith et al. | |
| 6,676,182 B2 | 1/2004 | Fitts | |
| 6,719,261 B2 | 4/2004 | Wadsworth | |
| 6,719,345 B2 | 4/2004 | Ootsuka et al. | |
| 6,722,541 B1 * | 4/2004 | Aftanas | B60R 9/00 224/403 |
| 6,742,973 B1 | 6/2004 | Hendrix et al. | |
| 6,752,449 B1 | 6/2004 | Wheatley | |
| 6,752,575 B1 | 6/2004 | Moore et al. | |
| 6,789,832 B2 | 9/2004 | Gort et al. | |
| 6,796,471 B2 | 9/2004 | Aftanas et al. | |
| 6,805,392 B2 | 10/2004 | Leitner et al. | |
| 6,811,203 B2 | 11/2004 | Wheatley | |
| 6,814,389 B2 | 11/2004 | Wheatley | |
| 6,824,191 B2 | 11/2004 | Wheatley | |
| 6,843,394 B2 | 1/2005 | Aki | |
| D501,443 S | 2/2005 | Jones et al. | |
| D504,384 S | 4/2005 | StrascheWski | |
| 6,874,747 B2 | 4/2005 | Oh | |
| 6,889,878 B2 | 5/2005 | Parsons | |
| 6,893,073 B2 | 5/2005 | Wheatley | |
| 6,913,175 B2 | 7/2005 | Martin | |
| 6,918,624 B2 | 7/2005 | Miller et al. | |
| 6,923,488 B2 | 8/2005 | Bruford et al. | |
| 6,942,225 B2 | 9/2005 | Gentemann et al. | |
| 6,948,763 B2 | 9/2005 | Robbins | |
| 6,966,595 B2 | 11/2005 | Bruford et al. | |
| 6,976,724 B2 | 12/2005 | Wheatley | |
| 6,983,972 B2 | 1/2006 | Tan et al. | |
| 6,994,389 B1 | 2/2006 | Graffy et al. | |
| 6,997,657 B1 | 2/2006 | Saward | |
| 7,007,995 B1 | 3/2006 | Scarberry et al. | |
| 7,014,400 B1 * | 3/2006 | LaBelle | B60P 7/0815 410/104 |
| 7,025,403 B2 | 4/2006 | Wheatley | |
| 7,040,849 B2 | 5/2006 | Cunningham et al. | |
| 7,063,366 B2 | 6/2006 | Leitner et al. | |
| 7,093,870 B2 | 8/2006 | Kim et al. | |
| 7,100,956 B1 | 9/2006 | Wilkins | |
| 7,111,886 B1 | 9/2006 | Miller et al. | |
| 7,121,604 B2 | 10/2006 | Reed | |
| 7,152,902 B2 | 12/2006 | Moen et al. | |
| 7,159,918 B2 | 1/2007 | Lussier | |
| 7,175,218 B1 | 2/2007 | Keene | |
| 7,175,377 B2 | 2/2007 | Womack et al. | |
| 7,182,380 B2 | 2/2007 | Nagle | |
| 7,188,888 B2 | 3/2007 | Wheatley et al. | |
| 7,195,432 B2 | 3/2007 | Earle et al. | |
| 7,204,540 B2 | 4/2007 | Wheatley | |
| D544,826 S | 6/2007 | Smith | |
| 7,226,100 B1 | 6/2007 | Willey et al. | |
| 7,229,116 B1 | 6/2007 | Bruford et al. | |
| 7,240,940 B2 | 7/2007 | Leitner | |
| 7,252,322 B2 | 8/2007 | Rusu | |
| 7,258,387 B2 | 8/2007 | Weldy | |
| 7,267,387 B1 | 9/2007 | Bruford et al. | |
| D553,072 S | 10/2007 | Smith | |
| 7,287,943 B1 | 10/2007 | SaWard | |
| 7,303,222 B2 | 12/2007 | Wilkins | |
| 7,322,633 B2 | 1/2008 | Zajicek et al. | |
| 7,334,830 B2 | 2/2008 | Weldy | |
| 7,347,473 B2 | 3/2008 | Miller et al. | |
| D568,230 S | 5/2008 | Smith | |
| 7,384,090 B1 | 6/2008 | Weldy | |
| 7,393,035 B2 | 7/2008 | Leitner et al. | |

(56) References Cited

U.S. PATENT DOCUMENTS

| | | | |
|---|---|---|---|
| 7,413,231 B1 | 8/2008 | Wood et al. | |
| 7,427,095 B2 | 9/2008 | Wheatley | |
| 7,445,264 B2 | 11/2008 | Spencer et al. | |
| 7,464,976 B2 | 12/2008 | Smith | |
| 7,484,790 B2 | 2/2009 | Wheatley | |
| 7,488,021 B1 | 2/2009 | Roos et al. | |
| 7,497,493 B1 * | 3/2009 | Thiessen | B60P 7/15 296/3 |
| 7,506,917 B2 | 3/2009 | Essig | |
| 7,513,543 B2 | 4/2009 | Erskine | |
| 7,537,264 B2 | 5/2009 | Maimin et al. | |
| 7,547,054 B2 | 6/2009 | Leitner | |
| 7,549,828 B2 | 6/2009 | Smith | |
| D597,924 S | 8/2009 | Smith | |
| 7,604,282 B2 | 10/2009 | Spencer et al. | |
| 7,607,714 B2 | 10/2009 | Wheatley et al. | |
| 7,628,442 B1 | 12/2009 | Spencer et al. | |
| 7,654,598 B2 | 2/2010 | Leitner et al. | |
| 7,654,599 B2 | 2/2010 | Stewart et al. | |
| 7,681,935 B2 | 3/2010 | Leitner et al. | |
| D627,703 S | 11/2010 | McLaughlin | |
| 7,823,957 B2 * | 11/2010 | Williamson | B60J 7/104 292/DIG. 49 |
| 7,841,638 B2 | 11/2010 | Smith | |
| 7,845,887 B2 | 12/2010 | Smith | |
| 7,857,371 B2 | 12/2010 | Leitner | |
| 7,874,774 B2 * | 1/2011 | Peterson | B60P 7/0815 410/104 |
| 7,878,568 B2 | 2/2011 | Wu | |
| 7,900,990 B2 | 3/2011 | Townson | |
| 7,905,536 B2 | 3/2011 | Yue | |
| 7,905,539 B2 | 3/2011 | De Carli | |
| 7,959,203 B2 | 6/2011 | Smith | |
| 8,020,737 B2 | 9/2011 | Sweeney | |
| 8,020,912 B2 | 9/2011 | Lounds | |
| 8,146,982 B2 | 4/2012 | Williamson et al. | |
| 8,262,148 B2 | 9/2012 | Rusher et al. | |
| 8,297,677 B2 | 10/2012 | Leitner et al. | |
| 8,336,946 B2 | 12/2012 | Schrader et al. | |
| 8,366,173 B2 | 2/2013 | Xu | |
| 8,474,896 B2 | 7/2013 | Ostberg | |
| 8,480,154 B2 | 7/2013 | Yue | |
| 8,511,736 B2 | 8/2013 | Williamson et al. | |
| 8,668,125 B2 | 3/2014 | Williams | |
| 8,672,388 B2 | 3/2014 | Rusher | |
| 8,678,459 B1 | 3/2014 | Win | |
| 8,727,415 B2 | 5/2014 | Smith | |
| 8,807,625 B2 | 8/2014 | Garska | |
| 9,266,416 B1 | 2/2016 | Nania | |
| 9,346,344 B2 | 5/2016 | Smith et al. | |
| 9,352,790 B2 | 5/2016 | Smith | |
| 9,399,391 B2 | 7/2016 | Bernardo et al. | |
| 9,487,071 B1 | 11/2016 | Yue | |
| 9,688,127 B2 * | 6/2017 | Hemphill | B60J 7/104 |
| 9,827,838 B2 | 11/2017 | Hannan et al. | |
| 9,827,839 B2 | 11/2017 | Williamson et al. | |
| 9,834,076 B2 | 12/2017 | Rohr et al. | |
| 9,834,259 B2 | 12/2017 | Smith | |
| 9,840,135 B2 | 12/2017 | Rusher et al. | |
| 9,840,136 B2 | 12/2017 | Smith et al. | |
| 9,937,848 B1 | 4/2018 | Grabowski et al. | |
| 10,081,235 B2 | 9/2018 | Freitas et al. | |
| 10,086,746 B2 | 10/2018 | Loew et al. | |
| 10,093,159 B1 | 10/2018 | Zichettello et al. | |
| 10,094,159 B2 | 10/2018 | Grudzinski et al. | |
| 10,099,544 B2 | 10/2018 | Battiato | |
| 10,106,022 B2 | 10/2018 | Xu | |
| 10,106,089 B2 | 10/2018 | Herman | |
| 10,112,465 B2 | 10/2018 | Flocco | |
| 10,137,766 B2 | 11/2018 | Bernardo et al. | |
| 10,144,276 B2 | 12/2018 | Facchinello et al. | |
| 10,166,849 B2 | 1/2019 | Facchinello et al. | |
| 10,232,691 B1 | 3/2019 | Weng et al. | |
| 10,308,101 B2 | 6/2019 | Kim et al. | |
| 10,328,778 B2 | 6/2019 | Aubrey et al. | |
| 10,399,421 B2 | 9/2019 | Smith et al. | |
| 10,457,124 B2 | 10/2019 | Bernardo | |
| 10,647,187 B2 | 5/2020 | Slinger et al. | |
| 10,800,231 B2 | 10/2020 | Bernardo et al. | |
| 10,850,676 B1 | 12/2020 | Worker | |
| 10,919,369 B2 | 2/2021 | Lewis et al. | |
| 11,040,605 B2 | 6/2021 | Bernardo | |
| 11,052,828 B2 | 7/2021 | Huisman | |
| 11,220,163 B2 | 1/2022 | Vickery | |
| D944,181 S * | 2/2022 | Connellan | D12/412 |
| 11,634,085 B2 * | 4/2023 | Luckette | B60R 9/065 224/403 |
| 11,654,978 B2 | 5/2023 | Smith | |
| 2001/0005960 A1 | 7/2001 | Yamaguchi et al. | |
| 2002/0000732 A1 | 1/2002 | Sanders | |
| 2002/0093216 A1 * | 7/2002 | Ananian | B60J 7/062 296/105 |
| 2002/0096268 A1 | 7/2002 | Schmeichel et al. | |
| 2002/0180235 A1 | 12/2002 | Wheatley | |
| 2004/0080174 A1 | 4/2004 | Buelna | |
| 2004/0124658 A1 | 7/2004 | Wheatley | |
| 2004/0134953 A1 | 7/2004 | Perez | |
| 2005/0077747 A1 | 4/2005 | De Gaillard et al. | |
| 2006/0091170 A1 | 5/2006 | Almhil | |
| 2006/0091171 A1 | 5/2006 | Wardell et al. | |
| 2006/0208524 A1 | 9/2006 | Brown et al. | |
| 2006/0263163 A1 | 11/2006 | Harberts et al. | |
| 2006/0267370 A1 | 11/2006 | Wheatley et al. | |
| 2006/0283900 A1 | 12/2006 | Stapleton | |
| 2007/0063529 A1 | 3/2007 | Weldy | |
| 2007/0096486 A1 | 5/2007 | Niedziela et al. | |
| 2007/0108792 A1 | 5/2007 | Weldy | |
| 2007/0170739 A1 | 7/2007 | Sims | |
| 2007/0262602 A1 | 11/2007 | Nagle | |
| 2008/0101883 A1 | 5/2008 | Derecktor | |
| 2008/0106114 A1 | 5/2008 | Wheatley | |
| 2008/0129077 A1 | 6/2008 | Weldy | |
| 2008/0143133 A1 | 6/2008 | Nichols | |
| 2008/0179911 A1 | 7/2008 | Spencer et al. | |
| 2009/0020576 A1 | 1/2009 | Gale | |
| 2009/0146449 A1 | 6/2009 | Steffens et al. | |
| 2010/0096872 A1 * | 4/2010 | Brogdon | B60R 11/00 296/3 |
| 2010/0283280 A1 | 11/2010 | Kohlstrand et al. | |
| 2011/0175387 A1 | 7/2011 | Smith | |
| 2012/0274091 A1 | 11/2012 | Yue | |
| 2012/0274092 A1 | 11/2012 | Yue | |
| 2012/0274093 A1 | 11/2012 | Yue | |
| 2012/0319423 A1 | 12/2012 | Smith | |
| 2013/0119693 A1 | 5/2013 | Leitner et al. | |
| 2013/0306694 A1 | 11/2013 | Langseder | |
| 2013/0341960 A1 | 12/2013 | Garska | |
| 2015/0001877 A1 | 1/2015 | Fink | |
| 2015/0054300 A1 | 2/2015 | Shi et al. | |
| 2015/0061315 A1 | 3/2015 | Facchinello et al. | |
| 2015/0102077 A1 | 4/2015 | Martin | |
| 2015/0183363 A1 | 7/2015 | Puchkoff | |
| 2016/0039274 A1 * | 2/2016 | Smith | B60J 7/102 296/100.18 |
| 2016/0090048 A1 | 3/2016 | Crandall et al. | |
| 2016/0263974 A1 | 9/2016 | Xu | |
| 2017/0066311 A1 | 3/2017 | Facchinello et al. | |
| 2017/0066384 A1 | 3/2017 | Finestone | |
| 2017/0144520 A1 | 5/2017 | Hemphill et al. | |
| 2017/0166105 A1 | 6/2017 | Puchkoff | |
| 2017/0197498 A1 | 7/2017 | Facchinello et al. | |
| 2017/0326956 A1 | 11/2017 | Marshall | |
| 2017/0341494 A1 | 11/2017 | Hannan et al. | |
| 2017/0349081 A1 | 12/2017 | Yilma et al. | |
| 2017/0355251 A1 | 12/2017 | Rossi | |
| 2017/0361755 A1 | 12/2017 | Yilma et al. | |
| 2018/0111542 A1 | 4/2018 | Mueller | |
| 2018/0147925 A1 | 5/2018 | Williamson et al. | |
| 2018/0154817 A1 | 6/2018 | Chambers | |
| 2018/0272930 A1 | 9/2018 | Dylewski et al. | |
| 2018/0281572 A1 | 10/2018 | Zichettello et al. | |
| 2018/0281573 A1 | 10/2018 | Zichettello et al. | |
| 2018/0281574 A1 | 10/2018 | Zichettello et al. | |
| 2018/0281575 A1 | 10/2018 | Singer | |

(56) References Cited

U.S. PATENT DOCUMENTS

| | | |
|---|---|---|
| 2018/0281576 A1 | 10/2018 | Zichettello et al. |
| 2018/0290527 A1 | 10/2018 | Marchlewski et al. |
| 2018/0290529 A1 | 10/2018 | Ching |
| 2018/0297456 A1 | 10/2018 | Stickles et al. |
| 2018/0339578 A1 | 11/2018 | Sullivan |
| 2018/0339581 A1 | 11/2018 | Rossi et al. |
| 2018/0339658 A1 | 11/2018 | Frederick et al. |
| 2018/0345768 A1 | 12/2018 | Frederick et al. |
| 2018/0345769 A1 | 12/2018 | Dylewski et al. |
| 2019/0100087 A1 | 4/2019 | Facchinello et al. |
| 2019/0118629 A1 | 4/2019 | Spencer |
| 2019/0168590 A1 | 6/2019 | O'Reilly |
| 2019/0291553 A1 | 9/2019 | Ma |
| 2019/0367101 A1 | 12/2019 | McFadden et al. |
| 2020/0016642 A1 | 1/2020 | Kraft et al. |
| 2020/0031289 A1 | 1/2020 | Williams |
| 2020/0056639 A1 | 2/2020 | Voegele et al. |
| 2020/0094660 A1 | 3/2020 | Ma |
| 2020/0108702 A1 | 4/2020 | Dylweski, II et al. |
| 2020/0148046 A1 | 5/2020 | Ma |
| 2020/0148281 A1 | 5/2020 | Elder et al. |
| 2022/0118834 A1 | 4/2022 | Vickery |

FOREIGN PATENT DOCUMENTS

| | | |
|---|---|---|
| CN | 106564417 | 5/2019 |
| DE | 2729235 | 1/1979 |
| FR | 2781249 | 1/2000 |
| SU | 0629098 | 10/1978 |
| WO | WO 1994/001298 | 1/1994 |
| WO | WO 2016/022164 | 2/2016 |

OTHER PUBLICATIONS

Roll-N-Lock 2015 Catalog for M-Series and A-series retractable truck bed covers.http://rollnlock.com/wp-content/uploads/2015/03/RNL_Catalog_2015_WEB.pdf.

\* cited by examiner

VEHICLE RACK ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to vehicle rack assemblies, such as rack assemblies that attach to a truck bed.

Description of the Related Art

Rack assemblies have been used to add storage space above or within truck beds. Some rack assemblies include cross rails can mount across truck beds to sidewalls of the truck bed. However, in many rack assemblies, it is difficult and/or time consuming to mount and un-mount such cross rails. Further, there are often limitations of where the cross rails can be mounted along the sidewalls of the truck bed.

SUMMARY

The systems, methods, and devices of this disclosure each have several innovative aspects, no single one of which is solely responsible for the desirable attributes disclosed herein.

Disclosed herein is a rack assembly configured to mount to sidewalls of a truck bed of a vehicle. In some embodiments, the rack assembly comprises: a first side rail configured to secure to a first sidewall of the truck bed, the first side rail comprising: a first end; a second end opposite the first end; a first flange; a second flange extending transverse with respect to the first flange, wherein, when the first side rail is secured to the first sidewall of the truck bed, the second flange is positioned adjacent to a top surface of the first sidewall; a first mounting station positioned along the second flange; and a second mounting station positioned along the second flange; and a first cross rail having a first end, a second end opposite the first end, and a length extending between the first and second ends, wherein the first end is configured to secure to the first side rail at the first mounting station and the second end is configured to secure to the first side rail at the second mounting station, the first cross rail comprising one or more channels extending along a portion of the length, and wherein, when the first and second ends of the first cross rail are secured at the first and second mounting stations of the first side rail, the first cross rail is parallel with the first side rail. In some embodiments, the first mounting station is positioned along the second flange proximate the first end and the second mounting station is positioned along the second flange proximate the second end. In some embodiments, the rack assembly further comprises: a second side rail configured to secure to a second sidewall of the truck bed, the second side rail comprising: a first end; a second end opposite the first end; a first flange; a second flange extending transverse with respect to the first flange, wherein, when the first side rail is secured to the second sidewall of the truck bed, the second flange is positioned adjacent to a top surface of the second sidewall; a first mounting station positioned along the second flange proximate the first end; and a second mounting station positioned along the second flange proximate the second end; wherein the first end of the first cross rail is further configured to secure to the first mounting station of the second side rail, and wherein, when the first and second ends of the first cross rail are secured at the first mounting stations of the first and second side rails, the first cross rail is non-parallel with the first side rail.

Disclosed herein is a rack assembly configured to mount to sidewalls of a truck bed of a vehicle. In some embodiments, the rack assembly comprises: a first side rail and a second side rail, each of the first and second side rails configured to secure to the sidewalls of the truck bed, each of the first and second side rails comprising a length and a plurality of mounting stations along the length; at least one cross rail having a first end, a second end opposite the first end, and a length extending between the first and second ends, the first and second ends configured to secure to the plurality of mounting stations of the first and second side rails. In some embodiments, the at least one cross rail is mountable in: a first position where the first and second ends are secured to two of the plurality of mounting stations on the first side rail; and a second position where the first end is secured to one of the plurality of mounting stations of the first side rail and the second end is secured to one of the plurality of mounting stations of the second side rail. In some embodiments, when the at least one cross rail is in the first position, the at least one cross rail is parallel with respect to the first side rail, and wherein, when the at least one cross rail is in the second position, the at least one cross rail is non-parallel with respect to the first side rail.

Disclosed herein is a rack assembly configured to mount to sidewalls of a truck bed of a vehicle. In some embodiments, the rack assembly comprises: a pair of side rails defining a support surface positionable over the sidewalls of the truck bed, each of the pair of side rails comprising: a first flange and a second flange transverse with respect to the first flange, wherein, when each of the pair of side rails is positioned over one of the sidewalls of the truck bed, the first flange is positioned adjacent to a top surface of one of the sidewalls and the second flange is adjacent to a side surface of the one of the sidewalls, and wherein the second flange comprises: a first side and a second side opposite the first side, the first side facing toward the side surface of the one of the sidewalls and the second side facing at least partially toward an interior of the truck bed; and a channel positioned along the second side and extending along a portion of a length of the side rail; at least one cross rail having a first end, a second end opposite the first end, a length extending between the first and second ends, wherein each of the first and second ends of the at least one cross rail are configured to secure to portions of the pair of side rails. In some embodiments, the channel is sized and shaped to receive at least a portion of a fastener stem and a rectangular-shaped lock head coupled to the fastener stem. In some embodiments, the channel is configured to allow movement of the fastener stem and rectangular-shaped lock head in a first direction along an axis extending through a length of the channel. In some embodiments, the channel is further configured to prevent removal of the fastener stem and rectangular-shaped lock head in a second direction that is transverse with respect to the first direction. In some embodiments, the second direction is perpendicular with respect to the first direction.

Disclosed herein is a rack assembly configured to mount to sidewalls of a truck bed of a vehicle. In some embodiments, the rack assembly comprises: a pair of side rails defining a support surface positionable over the sidewalls of the truck bed; and at least one cross rail having a first end, a second end opposite the first end, a length extending between the first and second ends, wherein the at least one cross rail comprises a cross-section having a top surface, a bottom surface opposite the top surface, a first side connecting the top and bottom surfaces, and a second side connecting the top and bottom surfaces. In some embodiments, the top surface comprises a first channel extending along a first portion of the length of the at least one cross rail, the first side comprises a second channel extending along a second portion of the length of the at least one cross rail, and the second side comprises a third channel extending along a third portion of the length of the at least one cross rail. In some embodiments, the first and second ends of the at least one cross rail are configured to secure to the pair of side rails. In some embodiments, at least one of the first, second, and third channels is sized and shaped to receive at least a portion of a fastener stem and a rectangular-shaped lock head coupled to the fastener stem. In some embodiments, the at least one of the first, second, and third channels is configured to allow movement of the fastener stem and rectangular-shaped lock head in a first direction along an axis extending through a length of the at least one of the first, second, and third channels. In some embodiments, the at least one of the first, second, and third channels is further configured to prevent removal of the fastener stem and rectangular-shaped lock head in a second direction that is transverse with respect to the first direction. In some embodiments, the second direction is perpendicular with respect to the first direction. In some embodiments, the cross-section of the at least one cross rail is trapezoidal-shaped. In some embodiments, the top surface comprises a shorter width than the bottom surface. In some embodiments, the first and second sides are angled with respect to at least one of the top and bottom surfaces.

Disclosed herein is a rack assembly configured to mount to sidewalls of a truck bed of a vehicle. In some embodiments, the rack assembly comprises: a pair of side rails defining a support surface positionable over the sidewalls of the truck bed, each of the pair of side rails comprising a first end, a second end opposite the first end, a length extending between the first and second ends, and a first interlocking portion along the length; at least one cross rail having a first end, a second end opposite the first end, a length extending between the first and second ends, and a second interlocking portion along the length. In some embodiments, the second interlocking portion of the at least one cross rail is configured to secure to the first interlocking portion of at least one of the pair of side rails.

Disclosed herein is a rack assembly configured to mount to sidewalls of a truck bed of a vehicle. In some embodiments, the rack assembly comprises: a pair of side rails defining a support surface positionable over the sidewalls of the truck bed, each of the pair of side rails comprising at least a first mounting station; and at least one cross rail having a first end, a second end opposite the first end, a length extending between the first and second ends, and one or more channels extending along a portion of the length. In some embodiments, each of the first and second ends of the at least one cross rail are configured to secure to one of the first mounting stations of the pair of side rails, wherein, when the at least one cross rail is secured to the pair of side rails at the first mounting stations, the at least one cross rail is transverse with respect to the pair of side rails. In some embodiments, each of the pair of side rails comprises a first end, a second end opposite the first end, and a length extending between the first and second ends, and each of the pair of side rails comprises the first mounting station and a second mounting station. In some embodiments, the first mounting station is positioned proximate to the first end and the second mounting station is positioned proximate to the second end, and wherein the first and second ends of the at least one cross rail are configured to secure to the first and second mounting stations of at least one of the pair of side rails. In some embodiments, each of the pair of side rails further comprises a third mounting station positioned along the length between the first and second ends. In some embodiments, the one or more channels are configured to allow removable attachment of equipment. In some embodiments, the one or more channels of the at least one cross rail extend along a majority of the length of the at least one cross rail. In some embodiments, the at least one cross rail comprises a top surface, a bottom surface opposite the top surface, and sides extending between the top and bottom surfaces, and wherein the one or more channels of the at least one cross rail comprises a first channel extending along the portion of the length on the top surface, wherein, when the at least one cross rail is secured to the pair of side rails at the first mounting stations, the top surface faces away from the truck bed of the vehicle. In some embodiments, the at least one cross rail further comprises a second channel extending along the portion of the length on one of the sides of the at least one cross rail. In some embodiments, the at least one cross rail further comprises a third channel extending along the portion of the length on another one of the sides of the at least one cross rail. In some embodiments, the rack assembly further comprises a plurality of clamp mounts configured to secure the pair of side rails to the sidewalls of the truck bed. In some embodiments, each of the pair of side rails comprises a first flange and a second flange transverse with respect to the first flange, wherein, when each of the pair of side rails is secured to one of the sidewalls of the truck bed, the first flange is positioned adjacent to a top surface of the one of the sidewalls and the second flange is adjacent to a side surface of one of the sidewalls, and wherein: each of the plurality of clamp mounts comprises a first portion configured to secure to the second flange of one of the pair of side rails and a second portion configured to contact a bottom surface of a lip of the one of the sidewalls of the truck bed. In some embodiments, each of the plurality of clamp mounts further comprises a third portion configured to contact the side surface of the one of the sidewalls of the truck bed. In some embodiments, the second flange comprises a channel facing towards the side surface of the one of the sidewalls when the rack assembly is attached to the truck bed, the channel extending along a length of the side rail, wherein the first portion of each of the plurality of clamp mounts comprises a fastener and a fastener head secured to the fastener, and wherein the channel comprises a cross-section that is configured to receive the fastener head and prevent movement of the fastener head out of the channel along a direction perpendicular to the length of the side rail.

DETAILED DESCRIPTION

Disclosed herein is a vehicle rack assembly that can provide simple and quick mounting of cross rails across and/or along a truck bed for a vehicle. The vehicle rack assembly can include side rails mountable to sidewalls of the truck bed and cross rails that can mount and/or otherwise secure to the side rails across the truck bed. The side rails can include a plurality of mounting stations along their lengths which can allow for portions (e.g., ends) of the cross rails to mount thereto. One or a plurality of cross rails can be secured to one or more of these mounting stations on the side rails for improved convenience and customization. Additionally, the cross rail(s) can be mounted (e.g., individually) to a single side rail over the sidewalls of the truck bed when a user desires to store the cross rails and leave the truck bed open and/or accessible.

Figure 1:
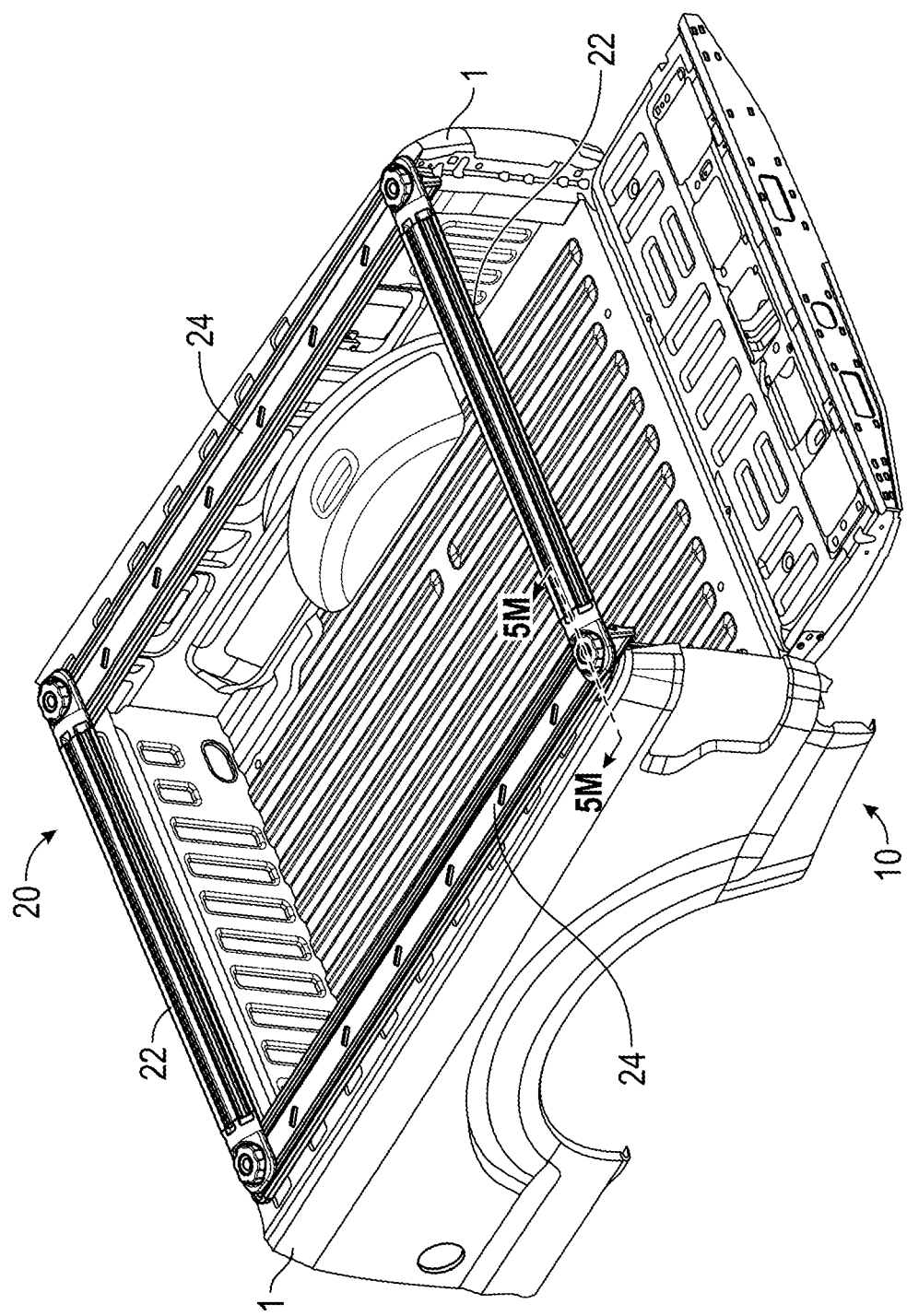
FIG. 1 illustrates a rack assembly mounted on sidewalls of a truck bed of a vehicle.
Figure 2:
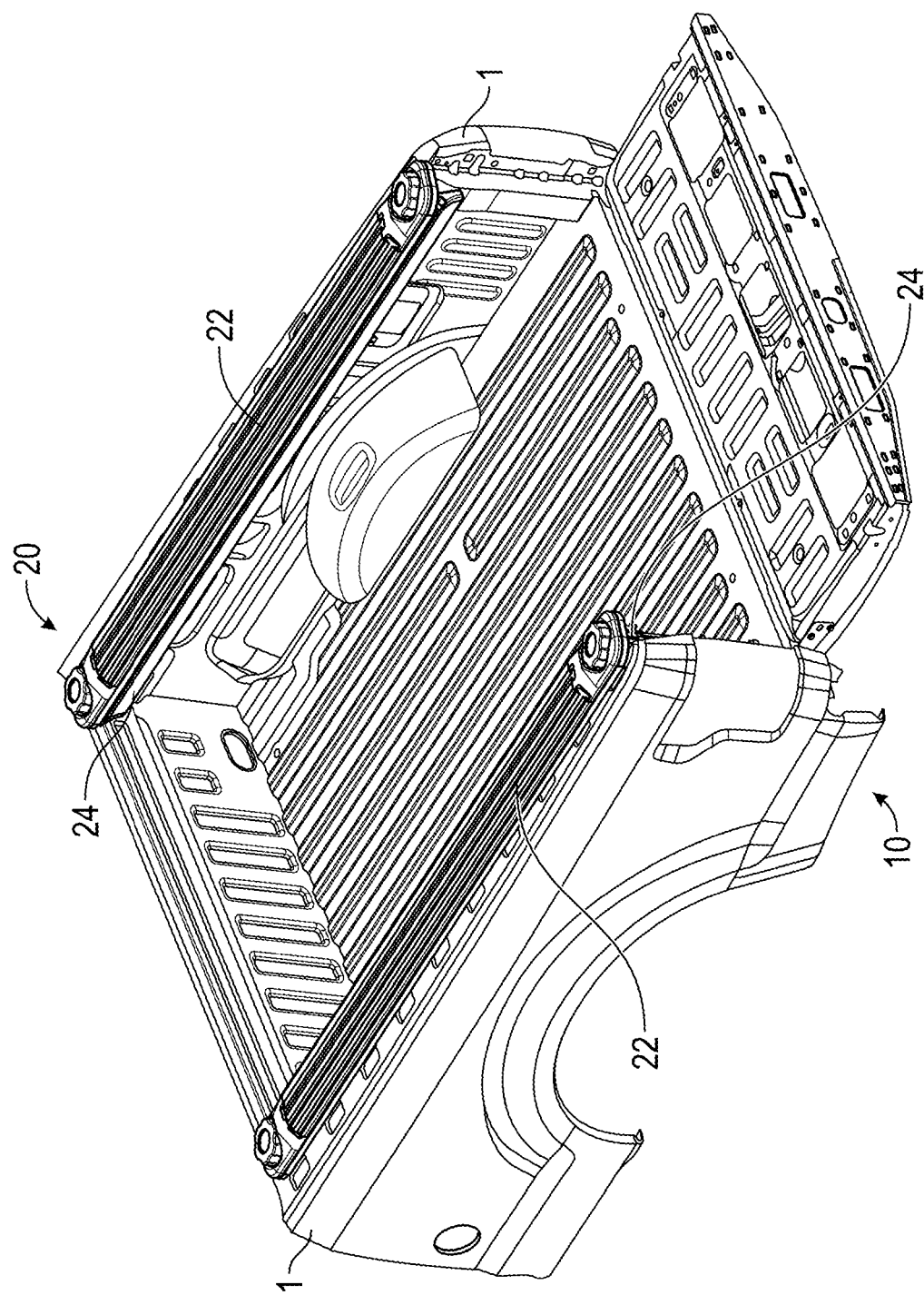
FIG. 2 illustrates the rack assembly of FIG. 1 in a storage position.

FIGS. 1-2 illustrate perspective views of a rack assembly 20 secured to sidewalls 1 of a vehicle 10. Only a portion of the vehicle 10 is illustrated for purposes of simplicity. As discussed in more detail below, the rack assembly 20 can include one or more side rails 24 and one or more cross rails 22. For example, the rack assembly 20 can include one or two side rails 24 and a plurality of cross rails 22, such as two, three, four, five, six, seven, or eight or more cross rails 22. As another example, the rack assembly 20 can include one cross rail 22 or at least one cross rail 22. As shown in FIGS. 1-2, the cross rails 22 can be mounted to one or both of the side rails 24. FIG. 1 illustrates two cross rails 22 mounted across the truck bed and to each of the two side rails 24.

Figure 3A:
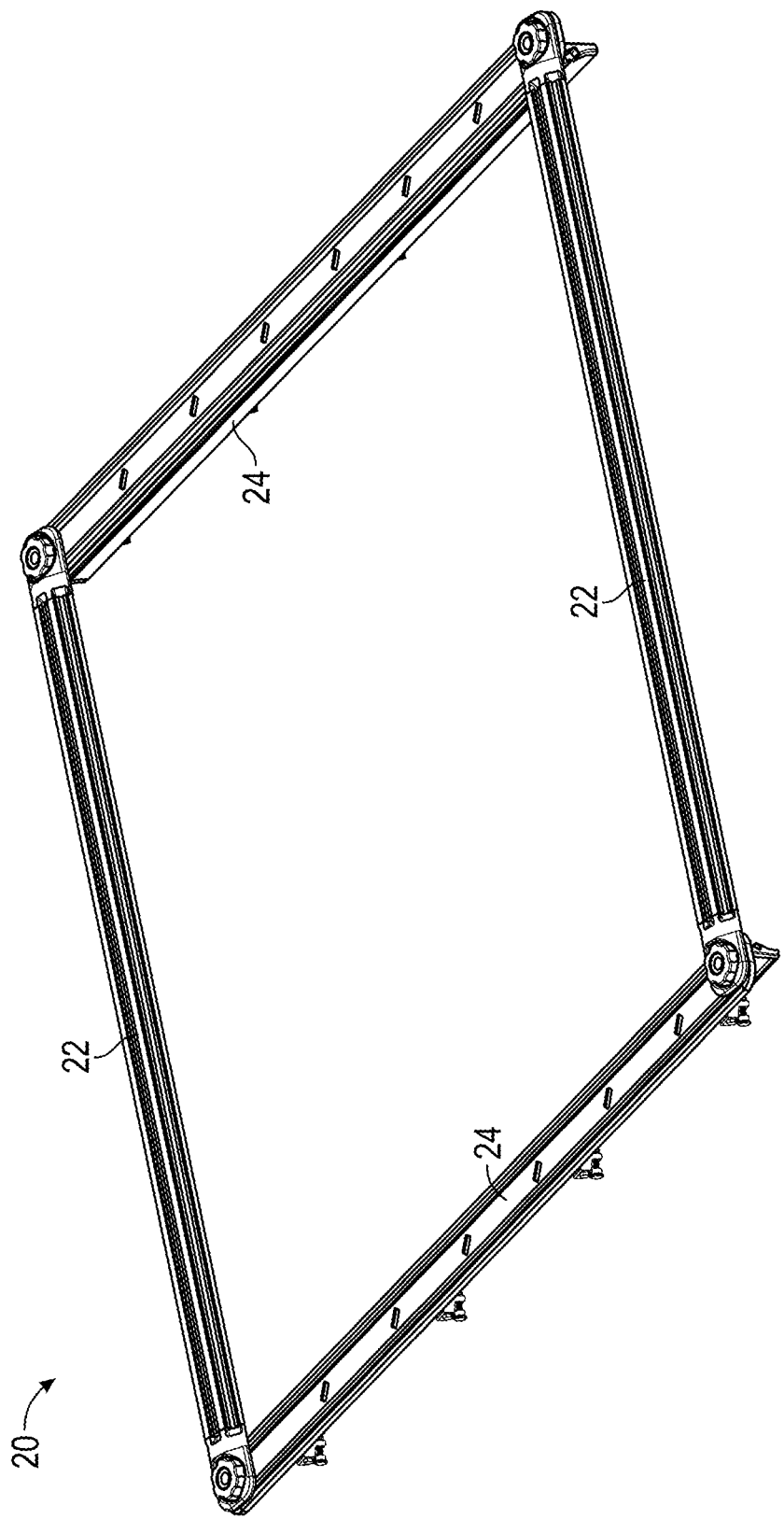
FIG. 3A illustrates the rack assembly of FIG. 1 removed from the truck bed of the vehicle where two cross rails are mounted at ends of a pair of side rails of the rack assembly.
Figure 3B:
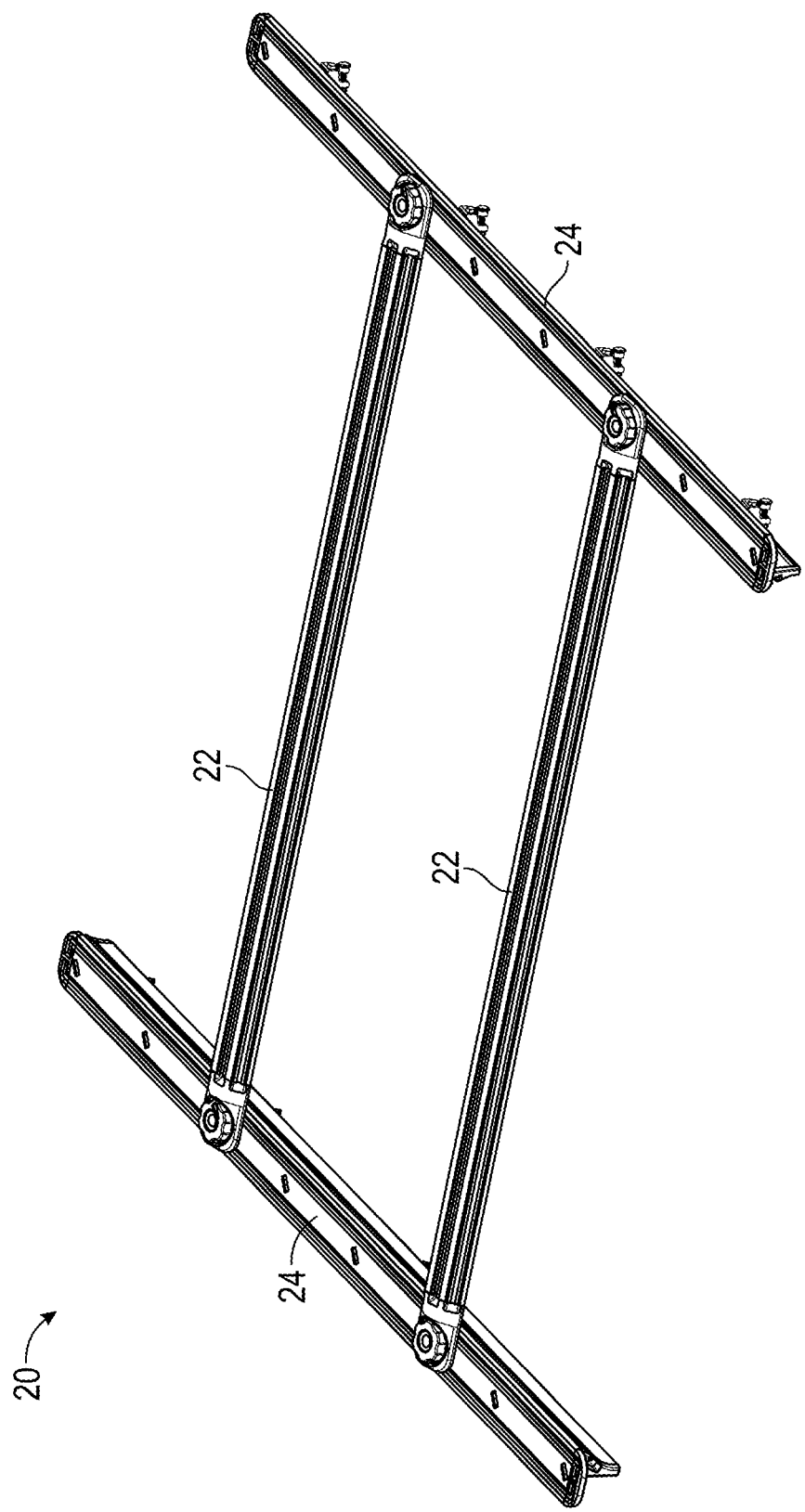
FIG. 3B illustrates the rack assembly of FIG. 3A where the two cross rails are mounted at intermediate positions along the pair of side rails.

When a cross rail 22 is mounted to two side rails 22 that are themselves secured to sidewalls 1 of the vehicle 10, the cross rail 22 can be transverse (for example, perpendicular) to one or both of the side rails 24 and/or one or both of the sidewalls 1. As discussed in more detail below, portions (for example, ends) of the cross rail 22 can be secured to the side rails 24 at various mounting stations along the length of the side rails 24. Accordingly, while FIGS. 1 and 3A illustrate the cross rails 22 mounted to the side rails 24 at ends thereof (for example, ends proximate to the cab and/or tailgate of vehicle 10), the cross rails 22 can be mounted at other locations along the length of the side rails 24. For example, the cross rails 22 can be mounted at intermediate locations along the lengths of the side rails 24 as shown in FIG. 3B. Further, while FIGS. 1 and 3A illustrate the cross rails 22 mounted to the side rails 24 such that the cross rails 22 are generally perpendicular to the side rails 24, the cross rails 22 could be mounted to the side rails 24 in a transverse, but not perpendicular configuration. For example, a first end of the cross rail 22 (for example, the interlocking assembly 42) can secure to a first mounting station on a first side rail 24 and a second end of the cross rail 22 can secure to a second mounting station on a second side rail 24 that is not aligned (for example, horizontally). In such configuration, a cross rail 22 can be mounted to two side rails 24 and can be diagonal (for example) with respect to one or both of the two side rails 24.

FIG. 3A illustrates two cross rails 22 mounted to ends of the pair of side rails 24, whereas FIG. 3B illustrates two cross rails 22 mounted at intermediate mounting stations along each of the pair of side rails 24 in between the ends of the side rails 24. Advantageously, the side rails 24 can include a plurality of mounting stations along their length which can allow customization for mounting the cross rail(s) 22 across the truck bed of vehicle 10.

FIG. 2 illustrates the cross rails 22 in a storage position, where two cross rails 22 are mounted overtop the side rails 24. In such configuration, ends of cross rails 22 (for example, the interlocking assembly 42) can secure to mounting stations of the side rails 24 (for example, mounting stations at ends of the side rails 24) so that the cross rails 22 can be conveniently stored such that the truck bed is open and/or accessible between the sidewalls 1 of vehicle 10. Thus, the rack assembly 20 can be easily transitioned from a use position (for example, FIGS. 1, 3A-3B) to a storage position (for example, FIG. 2). Additionally, even when the rack assembly 20 is in such storage position (FIG. 2), the cross rails 22 can allow equipment to be mounted thereto, for example, in one or more channels of the cross rails 22 such as those described below.

Figure 4A:
FIG. 4A illustrates the pair of side rails of the rack assembly of FIG. 3A.
Figure 4A:
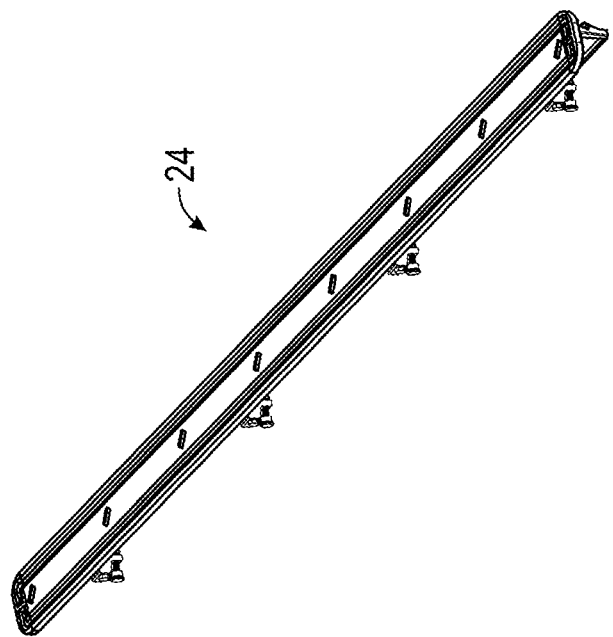
Figure 4B:
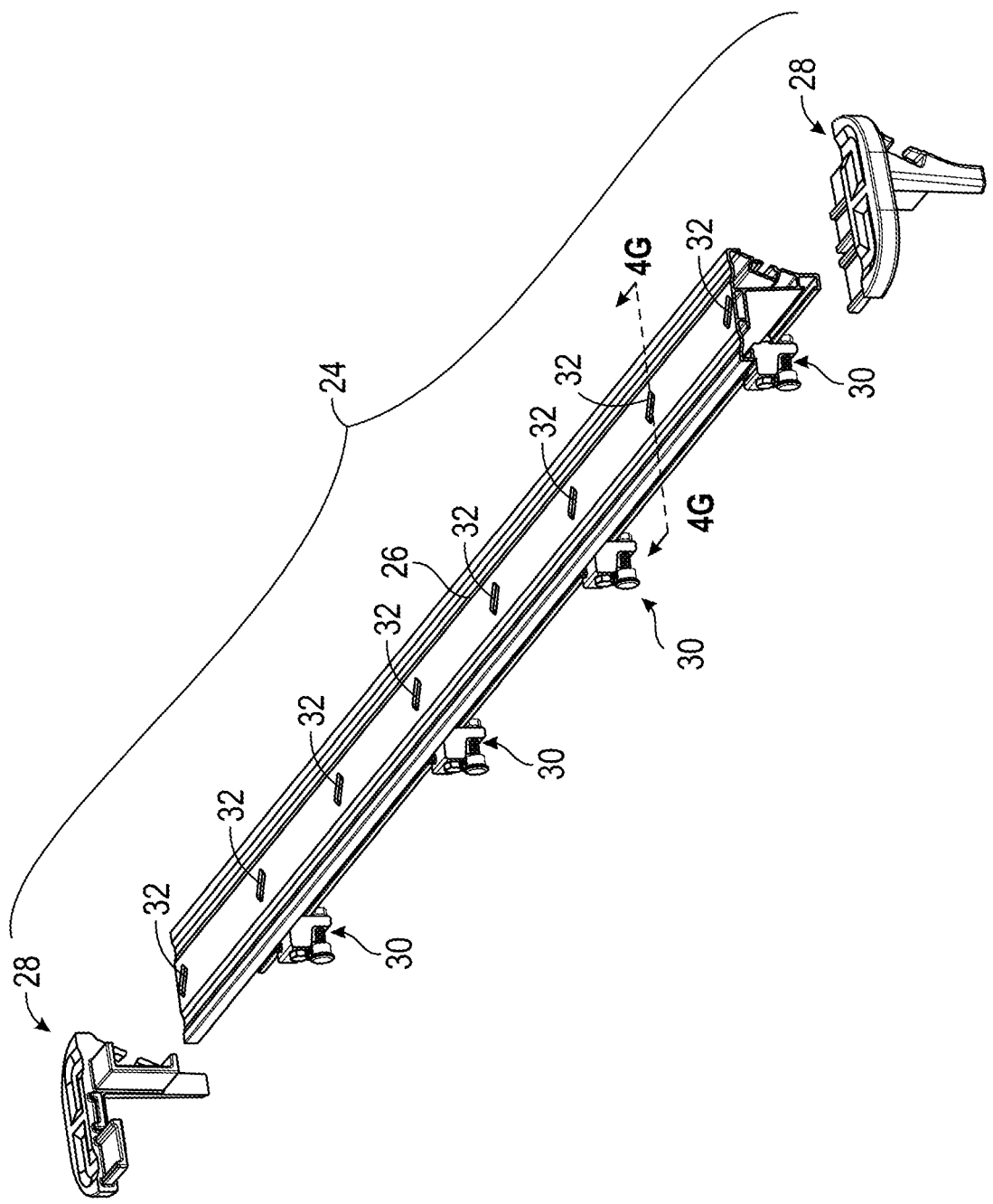
FIG. 4B illustrates an exploded view of a side rail of one of the pair of side rails of FIG. 4A.

FIG. 4A illustrates a perspective view of two side rails 24. FIG. 4B illustrates an exploded perspective view of one of the side rails 24 of FIG. 4A. Referring to FIG. 4B, the side rail 24 can include a main body 26 and one or more end caps 28 which can be secured (for example, attached) to ends of the main body 26. In some embodiments, the main body 26 comprises a metallic material, such as aluminum. FIG. 4B illustrates clamp mounts 30 which can be used to secure the side rail 24 to the sidewall 1 of vehicle 10 as discussed in more detail below. Clamp mounts 30 can be part of the side rail 24 (for example, integral or included with). Alternatively, the clamp mounts 30 can be separate (for example, not part of side rail 24). Regardless, the clamp mounts 30 can be used to secure the side rail 24 to portions of the sidewall 1 of the vehicle 10 (for example, a top surface, lip, and/or side surface of sidewall 1) such that movement of the side rail 24 with respect to the sidewall 1 is minimized or prevented when rack assembly 20 is in use.

As discussed above, side rail 24 can include one or more, or a plurality of, mounting stations which can secure to portions of the cross rails 22 to allow mounting of the same. Such mounting stations can be located along main body 26. For example, with reference to FIG. 4B, the mounting stations can comprise openings 32 positioned along a length of the main body 26 which can be sized and/or shaped to receive a latch or lock on a portion of the cross rail 22 to facilitate securement. For example, main body 26 can include one, two, three, four, five, six, seven, eight, nine, or ten or more openings 32 along its length. As another example, side rail 24 can include openings 32 proximate and/or adjacent to ends of the main body 26.

Figure 4C:
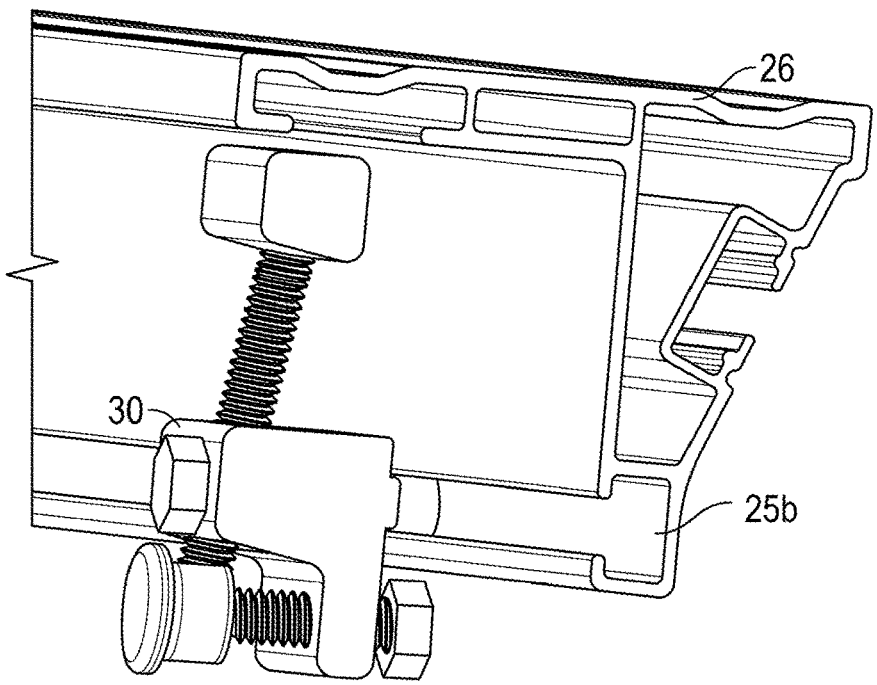
FIG. 4C illustrates an enlarged view of a clamp mount secured to a portion of the side rail of FIG. 4B.
Figure 4D:
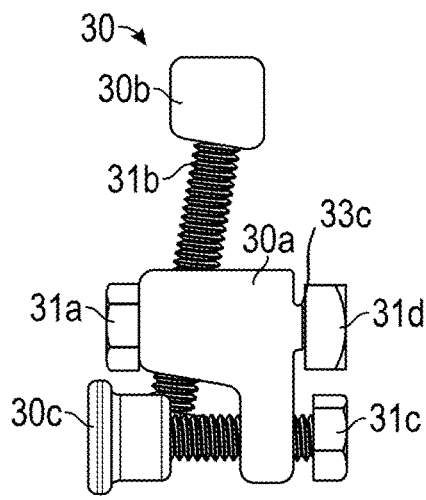
FIGS. 4D-4F illustrate views of the clamp mount of FIG. 4C.
Figure 4E:
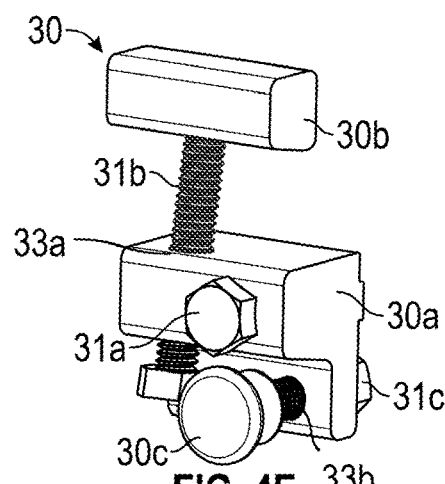
Figure 4F:
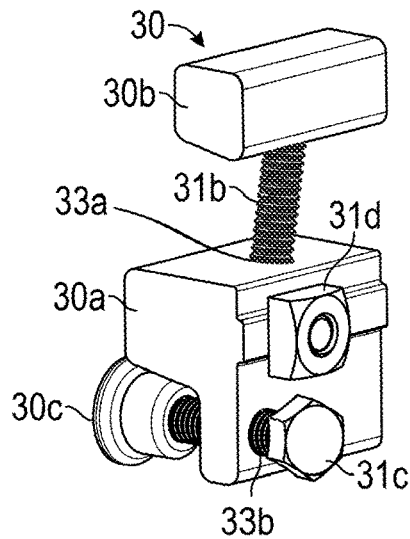
Figure 4G:
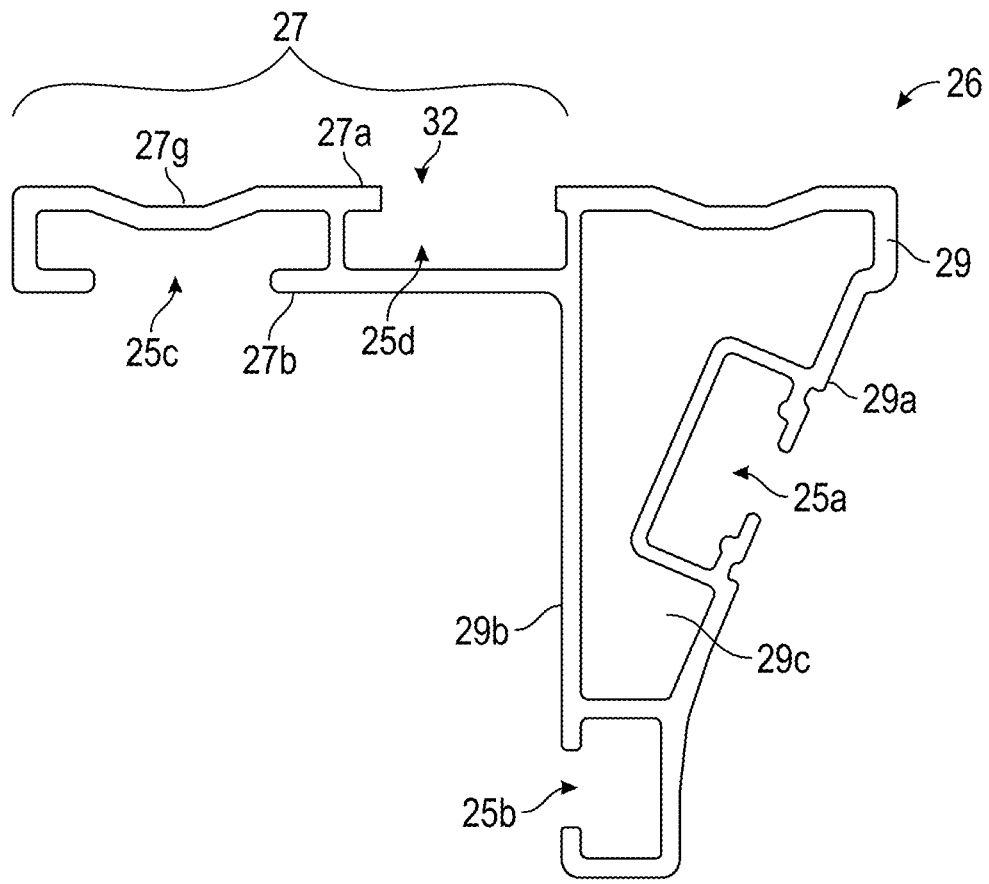
FIG. 4G illustrates a cross-sectional view of the side rail of FIG. 4B.
Figure 5A:
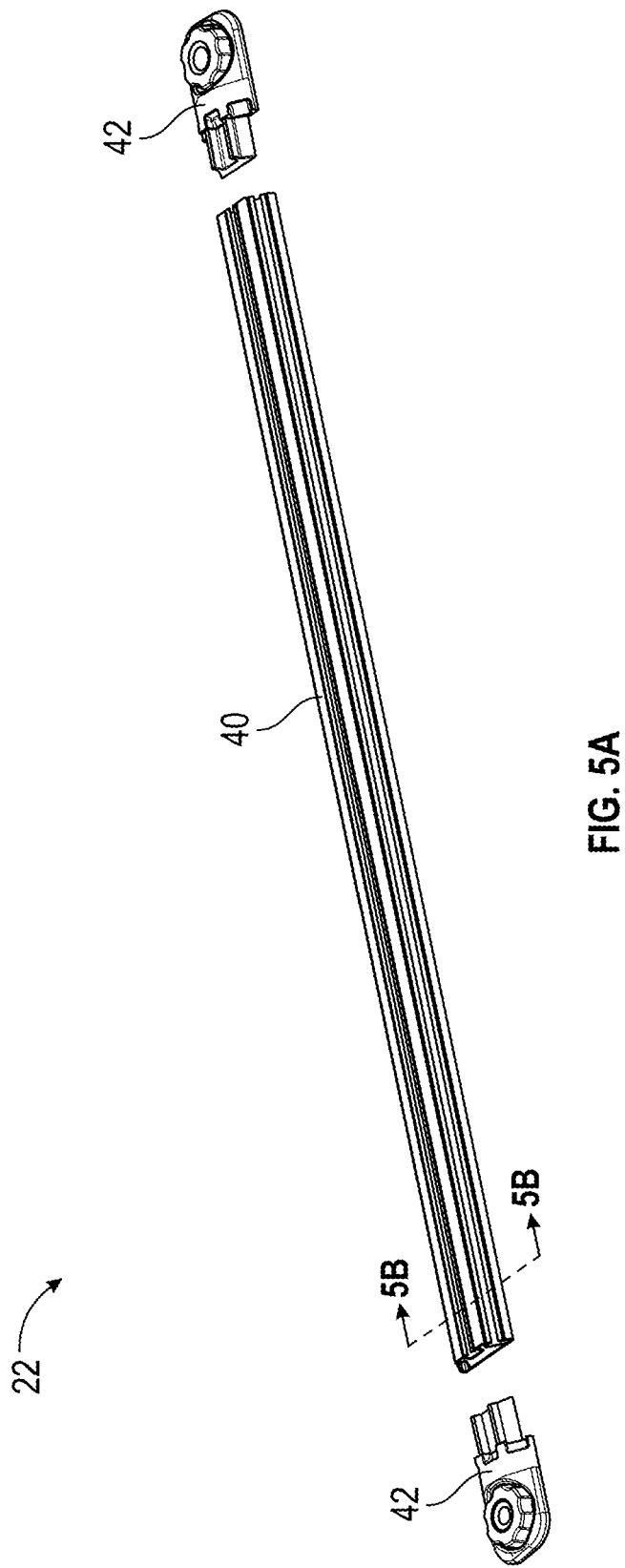
FIG. 5A illustrates a cross rail of the rack assembly as shown in FIGS. 3A-3B.
Figure 5B:
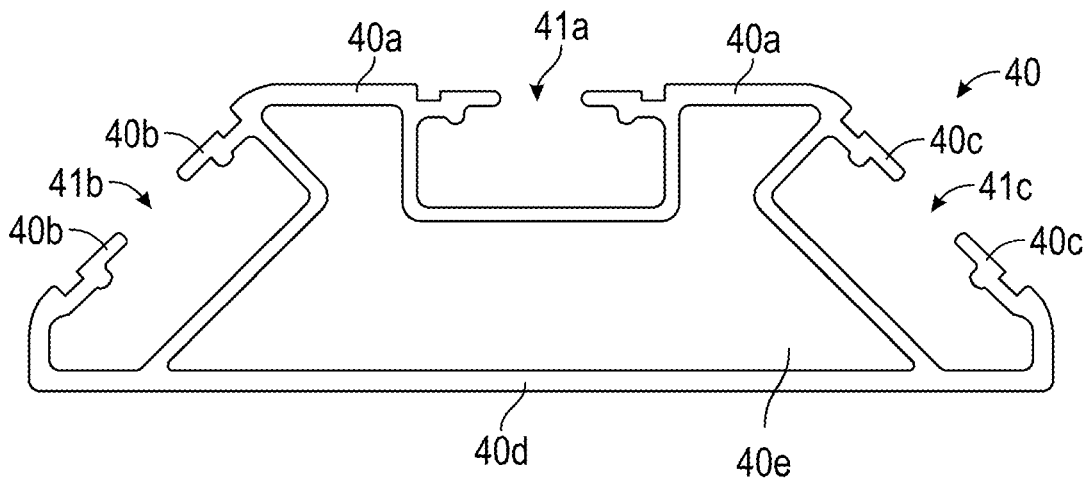
FIG. 5B illustrates a cross-sectional view of the cross rail of FIG. 5A.

FIG. 4G illustrates a cross-section through the main body 26 of the side rail 24 as shown in FIG. 5A. As discussed above, the side rail 24 can mount and/or secure to portions of the sidewall 1 of vehicle 10. Such securement can allow the side rail 24 to safely transfer loads from, for example, the cross rail 22 to the sidewalls 1. The main body 26 can include a mount which can rest upon and/or secure to a top surface of the sidewalls 1 of the vehicle 10. For example, the mount of the main body 26 can include a first flange 27 that can rest upon and/or secure to a top surface of sidewall 1 when side rail 24 is secured thereto. Additionally or alternatively, the main body 26 can include a brace, which can be connected to the mount of the main body 26, that can contact and/or secure to a side surface of the sidewall 1 of the vehicle 10 when side rail 24 is in use. For example, the main body 26 can include a second flange 29 that can rest against and/or secure to a side surface of the sidewall 1. FIG. 5M, which is discussed in more detail below, illustrates side rail 24 secured to sidewall 1, and further illustrates how first flange 27 and second flange 29 can contact and/or secure to surfaces of the sidewall 1.

Returning back to FIG. 4G, main body 26 can include a channel 25*d* extending along a portion of the length of the main body 26. As shown, such channel 25*d* can be positioned below the opening(s) 32 discussed previously. In some embodiments, channel 25*d* can extend continuously along a portion of the length of the main body 26 adjacent (for example, "underneath") the openings 32. For example, in the embodiment shown in FIG. 4B where side rail 24 includes eight openings 32, channel 25*d* can extend continuously underneath openings 32 along the length of the main body 26. As an alternative to channel 25*d* extending continuously in such manner, channel 25*d* can extend non-continuously along the length of the main body 26 underneath openings 32. For example, channel 25*d* can extend along the length of main body 26 underneath openings 32 but not extend between the openings 32. For example, channel 25*d* can extend underneath openings 32 and along portions of the main body 26 slightly beyond openings 32. Regardless of the length or configuration of the channel 25*d*, the openings 32 can be sized and/or shaped to allow a latch or lock to pass through a top surface 27*a* of the first flange 27 and into channel 25. Such latch or lock can be, for example, a locking head 50*b* of interlocking portion 50 discussed in more detail below. As will also be discussed in more detail below, when such latch or lock is inserted through opening 32 and within channel 32, the latch or lock can be prevented from moving (for example, rotating). Additionally, where such latch or lock is coupled to a portion of cross rail 22 (for example, part of an interlocking assembly 42), the cross rail 22 can be mounted securely in place on the side rail 24.

Main body 26 can include openings or channels that allow securement of the end caps 28. For example, as shown in FIG. 4D, the first flange 27 can include a channel 25*c* that is sized and/or shaped to receive a protrusion 28*e* (see FIGS. 4G-4I). Additionally or alternatively, channel 25*d* described above can be sized and/or shaped to receive a protrusion 28*d* of end cap 28 (see FIGS. 4G-4I). Additionally or alternatively, main body 26 can include a hollow portion 29*c* which is sized and/or shaped (for example, at least in part) to receive a protrusion 28*c* of end cap 28 (see FIGS. 4G-4I). Thus, channels 25*c*, 25*d*, and/or hollow portion 29*c*, and protrusions 28*e*, 28*d*, and/or 28*c* can allow end caps 28 to be secured to ends of main body 26 of side rail 24. As shown in FIG. 4G, channels 25*c*, 25*d*, and/or hollow portion 29*c* can be sized and/or shaped to allow insertion of protrusions 28*e*, 28*d*, 28*c* along an axis extending through the channels 25*c*, 25*d*, and/or hollow portion 29*c*, and channels 25*c*, 25*d*, and/or hollow portion 29*c* can be sized and/or shaped to prevent movement of the protrusions 28*e*, 28*d*, 28*c* (once inserted) in a direction that is perpendicular to such axis.

With further reference to FIG. 4G, the first flange 27 and the second flange 29 can be transverse (for example, perpendicular) to one another in some embodiments.

As discussed above, side rail 24 can be secured to a sidewall 1 of vehicle 10 using one or more clamp mounts 30. Clamp mounts 30 can be removably secured to main body 26 of side rail 24. For example, with reference to FIGS. 4C-4G, clamp mounts 30 can include an insert or a lock 31*d* that can be sized and/or shaped to fit within a channel 25*b* of the second flange 29 of main body 26 of side rail 24. Channel 25*b* can, in turn, be sized and/or shaped to receive lock 31*d*. For example, lock 31*d* can have a rectangular, square, circular, or other cross-section and channel 25*b* can have a cross-section that can match and/or accommodate one or more of these cross-sections of the lock 31*d*, and vice versa. Further, as shown channel 25*b* can be sized and/or shaped to allow insertion and/or movement of the lock 31*d* within the channel 25*c* along an axis extending through the channel 25*b* and can be sized and/or shaped to prevent movement of the lock 31*d* in a direction that is not parallel to such axis. In such configuration, channel 25*b* can conveniently allow clamp mount 30 to be secured to side rail 24 and allow customization of positioning of the clamp mount 30 along a length of the side rail 24. Further, such customization can allow the clamps mounts 30 to secure to and/or against the sidewalls 1 of the vehicle at various locations along a length of the sidewalls 1 (see FIG. 4C).

Side rail 24 can include one or more channels which can allow mounting of equipment. For example, as shown in FIG. 4G, second flange 29 can include a channel 25*a* along a side surface 29*a* of second flange 29. Where main body 26 and side rail 24 are mounted to a left sidewall 1 of vehicle, as shown in FIG. 1, side surface 29*a* and channel 25*a* can face at least partially towards the interior of the truck bed (for example, towards the bed floor). Such channel 25*a* can have a cross section configured to receive a T-shaped insert (also referred to as "anchor") which can be coupled to equipment, for example. In some embodiments, channel 25*a* can be sized and/or shaped to allow insertion and/or movement of a T-shaped insert within the channel 25*a* along an axis extending through the channel 25*a* and can be sized and/or shaped to prevent movement of such T-shaped insert in a direction that is not parallel to such axis (for example, when such T-shaped insert is in a certain rotational position within the channels channel 25*a*). Additionally or alternatively, in some cases, the T-shaped insert can be inserted into and/or removed from the channel 25*a* along a direction perpendicular to a length of the channel 25a by rotating the T-shaped (or a portion thereof). For example, a portion 66b of mounting anchor 60 (discussed further below) can be rotated and inserted into the channel 25a and then, once inside the channel 25a at least partially rotated such that the channel 25a prevents removal of the portion 66b along a direction perpendicular to a length of the channel 25a (but can allow movement of the portion 66b along a the length of the channel 25a). An exemplary T-shaped insert that can be utilized with and/or secured to any of channel 25a is mounting anchor 60 which is described further below. Thus, any or all of channel 25a can allow for equipment to be mounted to cross rail 22 within, above, and/or to the left or right of a truck bed. Such T-shaped insert can in turn include and/or be connected to an attachment mechanism that allows attachment of equipment. For example, such T-shaped insert and connected attachment mechanism can be similar in some, many, or all respects as the mounting anchor 60 described further below. Thus, channel 25a can allow for equipment to be mounted to side rail 24 within and/or above a truck bed. Further, where one or more cross rails 22 are mounted to the side rails 24, such channel 25a can allow for equipment to be mounted to side rail 24 below such cross rails 22 within an interior of the truck bed. Channel 25d and/or opening 32 can be sized and/or shaped to allow T-shaped inserts to be inserted into and/or removed along the channel 25d in a similar or identical manner as that described above with reference to channel 25a.

Figures 4H, 4I:
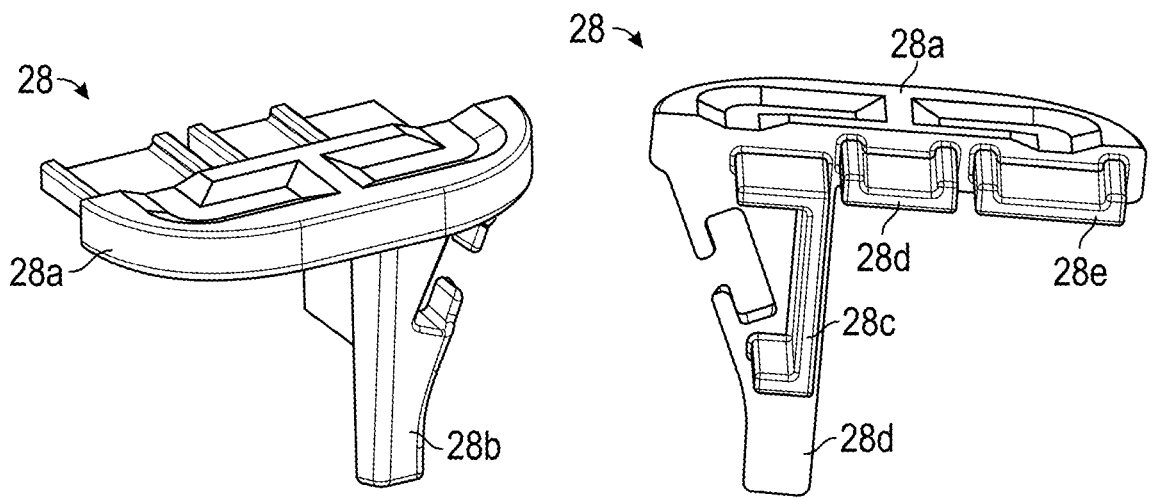
FIGS. 4H-4I illustrate perspective views of end caps of the side rail of FIG. 4B.

As shown in FIGS. 4G-4I, end caps 28 can be sized and/or shaped to match a size and/or shape of the cross section of the main body 26. For example, end cap 28 can include a base 28a which can include the protrusions 28e, 28d, and have a cross section that is similar in size and/or shape to the first flange 27 and/or second flange 29 and/or portions thereof. End cap 28 can additionally have a leg 28d that extends from the base (for example, transverse to the base) which can include protrusion 28c and has a cross section that is similar in size and/or shape to the second flange 29 and/or a portion thereof. Desirably, the end caps 28 are sized and shaped to be held within the main body 26 of the side rails 24 via friction force.

As discussed above, side rail 24 can be secured to sidewall 1 of vehicle 10 using one or more clamp mounts 30. With reference to FIGS. 4C-4F, clamp mount 30 can include a body portion 30a and one or more of clamps 30b, 30c. Clamp 30b can be secured (for example, threadingly secured) to a fastener 31b (for example, a threaded fastener), which can include a fastener head (for example, a hex head). As shown in at least FIGS. 4E-4F, fastener 31b can extend through a through-hole 33a in body portion 30a. Such through-hole 33a can be threaded so as to allow fastener 31b to be moved through and/or along the through-hole 33a to allow extension and/or retraction of clamp 30b which is coupled to fastener 31b. As discussed in more detail below, such clamp 30b can be configured to secure to an underside of a top surface of sidewall 1 and/or a lip of the sidewall 1. As also discussed in more detail below, clamp 30b can help press the top surface and/or lip of sidewall 1 against one or more surfaces of the side rail 24 (for example, an inside surface near a corner intersection of first and second flanges 27, 29 of main body 26 (see FIGS. 4G and 5M).

Clamp 30c can be secured (for example, threadingly secured) to a fastener 31c (for example, a threaded fastener), which can include a fastener head (for example, a hex head). As shown in FIGS. 4D-4F, fastener 31c can extend through a through-hole 33b in body portion 30a. Such through-hole 33b can be threaded so as to allow fastener 31c to be moved through and/or along the through-hole 33b to allow extension and/or retraction of clamp 30c which is coupled to fastener 31c. As discussed in more detail below, such clamp 30c can be extended so as to press against a side surface of the sidewall 1 in order to prevent movement (for example, rotation) of side rail 24 with respect to sidewall 1.

As discussed above, clamp mount 30 can be secured to the side rail 24. For example, clamp mount 30 can include a lock 31d that is sized and/or shaped to be received within channel 25b of main body 26 of side rail 26 (see FIGS. 4C-4G). Lock 31d can be secured (for example, threadingly secured) to a fastener 31a. Fastener 31a can extend through a through-hole 33c in body portion 30a. Lock 31d can have a square, rectangular, circular, hexagonal, or other cross section. In some embodiments, lock 31d has a cross-section that is similar but not identical to the interior space defined within a cross section of channel 25b. For example, lock 31d can have a rectangular cross section that is sized and/or shaped to allow the lock 31 to be restricted from movement in a direction that is non-parallel to an axis extending through channel 25b when the lock is in an upright position, while also sized and/or shaped to allow the lock 31d to be pulled out of channel 25a along a direction that is perpendicular to such axis when lock 31d is in a horizontal position. For example, the lock 31d can have cross section that allows the lock 31d to be moved within and/or removed from the channel 25b along an axis extending through the channel 25b. Such optional configuration can thus allow clamp mount 30 to be removed from channel 25a efficiently and conveniently.

FIG. 5A illustrates an exploded view of the cross rail 22 of FIGS. 1-3B. Cross rail can include a main body 40 and interlocking assemblies 42 which can be secured to ends of the main body 40. In some embodiments, main body 40 comprises a metal, such as aluminum. FIG. 5B illustrates a cross section through main body 40. As shown, main body 40 can include a top surface 40a, bottom surface 40d opposite the top surface 40a, and sides 40b, 40c extending between the top and bottom surfaces 40a, 40d. Main body 40 of cross rail 22 can have a trapezoidal cross section, as shown. However, main body 40 can have a different shaped cross section, for example, a square, rectangular, circular, rhombus, parallelogram, or triangular shaped cross section, among others. Main body 40 can include a hollow or open interior portion 40e that can be sized and/or shaped to receive a protrusion 42c on interlocking assembly 42 (see FIGS. 5B-5F).

Main body 40 can include one or more channels extending along portions of its length which can receive and/or secure T-shaped inserts or anchors so as to allow mounting of equipment, similar or identical that that described with reference to channel 25a of side rail 24 above. For example, main body 40 can include a channel 41a proximate and/or defined by the top surface 40a of main body 40. Main body 40 can additionally or alternatively include one or both of channels 41b, 41c proximate and/or defined by the sides 40b, 40c of main body 40. Such channels 41a, 41b, 41c can extend along all or a portion of the length of main body 40. Any of all of channels 41a, 41b, 41c can have a cross section configured to receive a T-shaped insert (also referred to as "anchor") which can be coupled to equipment, for example. In some embodiments, any or all of channels 41a, 41b, 41c can be sized and/or shaped to allow insertion and/or movement of a T-shaped insert within the channels 41a, 41b, 41c along an axis extending through the channels 41a, 41b, 41c and can be sized and/or shaped to prevent movement of such T-shaped insert in a direction that is not parallel to such axis (for example, when such T-shaped insert is in a certain rotational position within the channels 41a, 41b, 41c). Additionally or alternatively, in some cases, the T-shaped insert can be inserted into and/or removed from the channels 41a, 41b, 41c along a direction perpendicular to a length of the channels 41a, 41b, 41c by rotating the T-shaped (or a portion thereof). For example, a portion 66b of mounting anchor 60 (discussed further below) can be rotated and inserted into the channels 41a, 41b, 41c and then, once inside the channel 41a, 41b, 41c, at least partially rotated such that the channel 41a, 41b, 41c prevents removal of the portion 66b along a direction perpendicular to a length of the channel 41a, 41b, 41c (but can allow movement of the portion 66b along a the length of the channel 41a, 41b, 41c). An exemplary T-shaped insert that can be utilized with and/or secured to any of channels 41a, 41b, 41c is mounting anchor 60 which is described further below. Thus, any or all of channels 41a, 41b, 41c can allow for equipment to be mounted to cross rail 22 within, above, and/or to the left or right of a truck bed.

FIGS. 5C-5F illustrate various perspective views of interlocking assembly 42. Interlocking assembly 42 can advantageously allow cross rail 22 to secure (for example, mount) to one or more of the mounting stations of the side rails 24. Interlocking assembly 42 can include an end having a protrusion 42c extending therefrom that can be sized and/or shaped to be received within a portion of ends of main body 40 of cross rail 22. For example, protrusion 42c can be sized and/or shaped to fit within the hollow portion 40e of main body 40. Advantageously, in order to allow convenient installation of T-shaped anchors into channels 41a, 41b, 41c when interlocking assemblies 42 are coupled to ends of main body 40, interlocking assembly 42 can include slots 49. Slots 49 can be sized and/or shaped to allow T-shaped anchors and/or fastener heads coupled to fasteners to be inserted (for example, slidably) within channels 41a, 41b, 41c. The mounting anchor 60 discussed below can be mounted within channels 41a, 41b, 41c via the slots 49, for example.

Figure 5C:
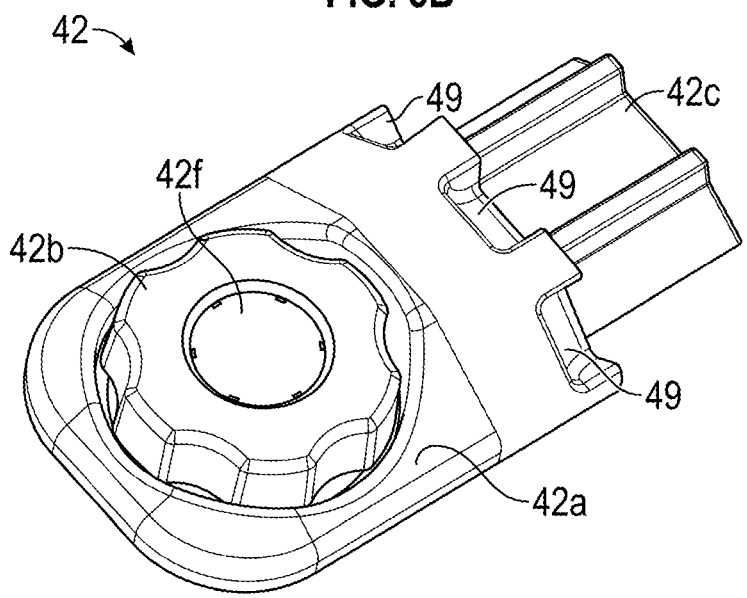
FIGS. 5C-5F illustrate various perspective views of an interlocking assembly of the cross rail of FIG. 5A.
Figure 5D:
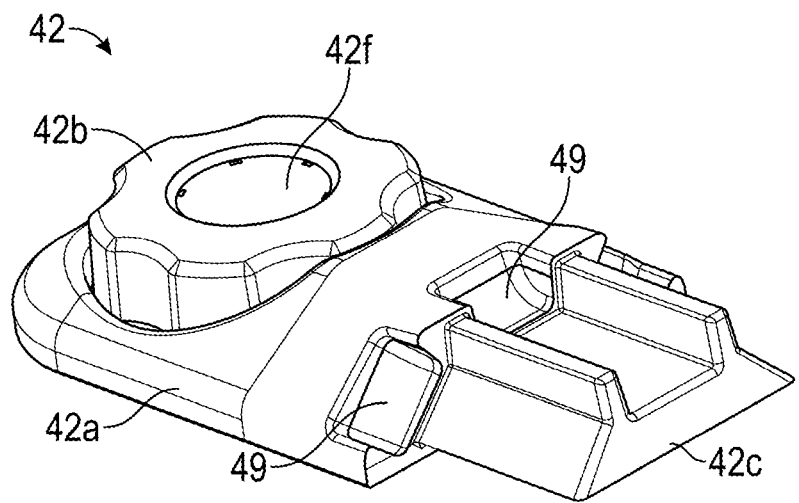
Figure 5E:
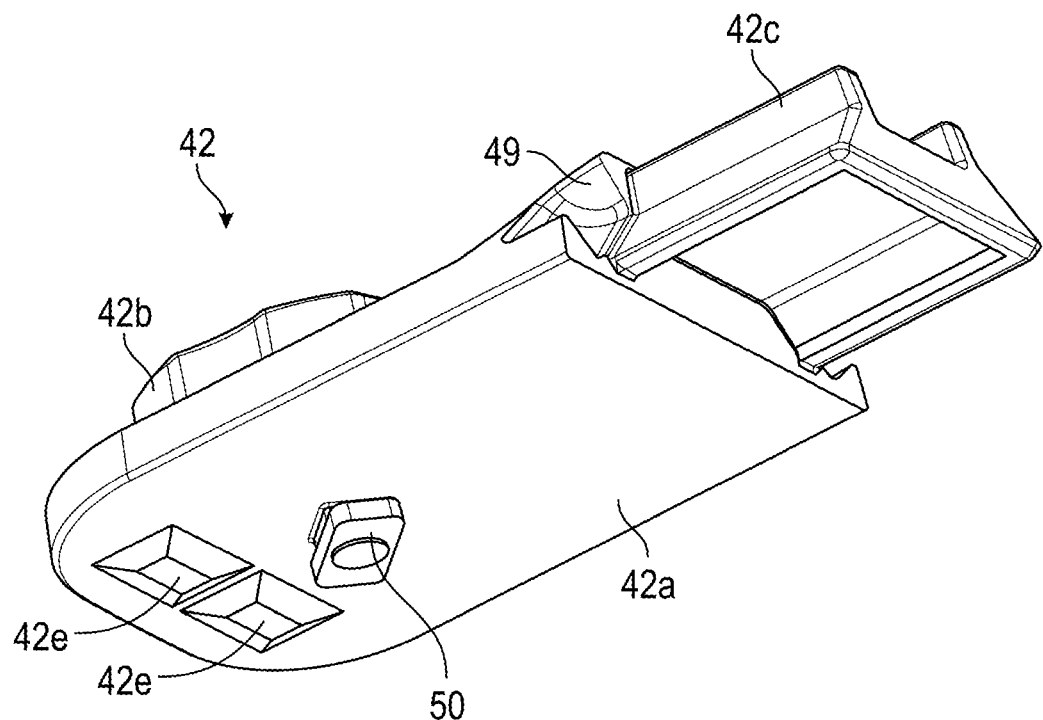
Figure 5F:
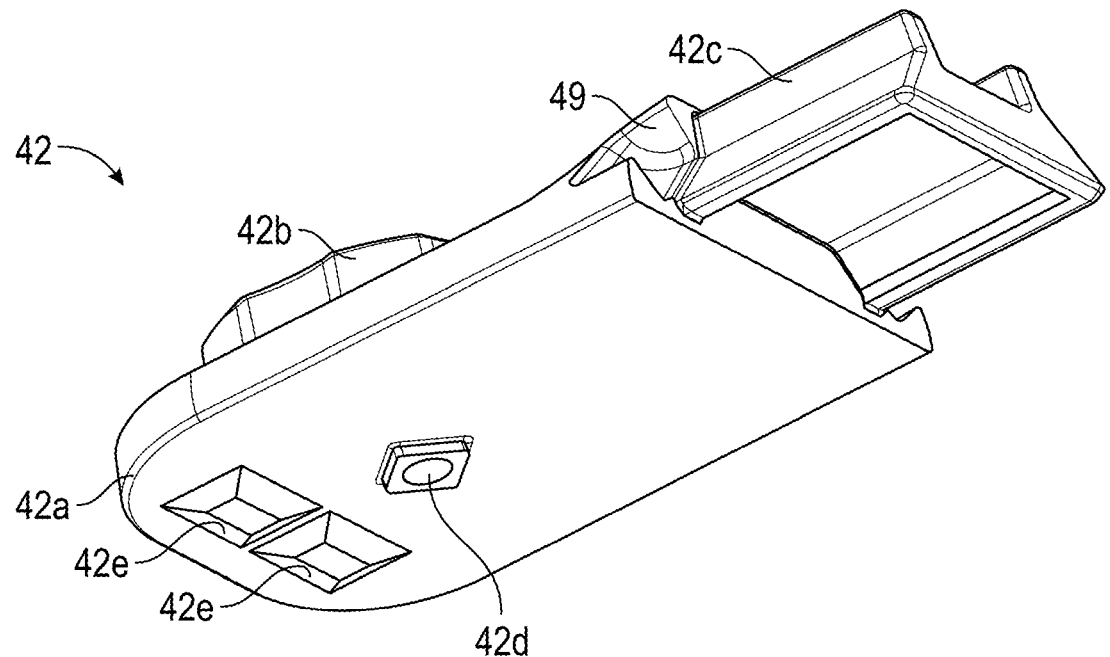
Figure 5G:
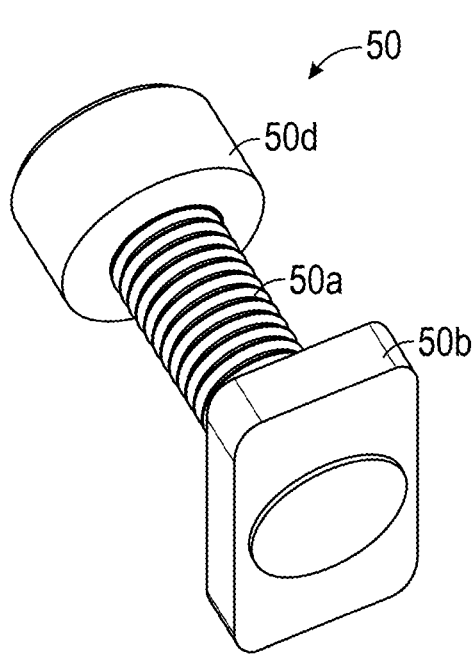
FIGS. 5G-5I illustrate an interlocking portion of the interlocking assembly of FIGS. 5C-5F.
Figure 5H:
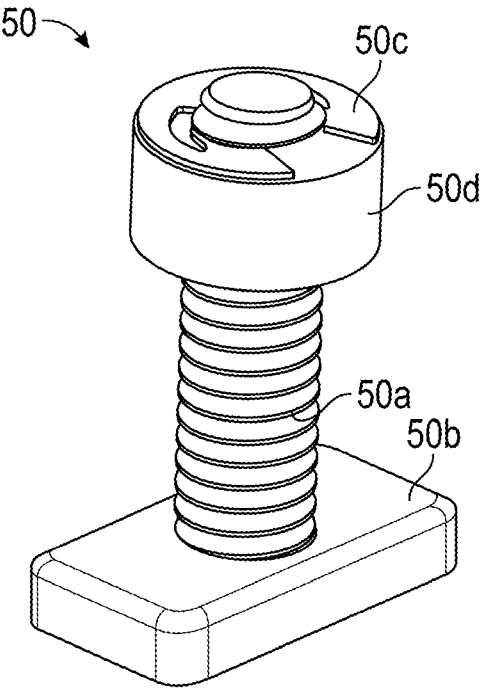
Figure 5I:
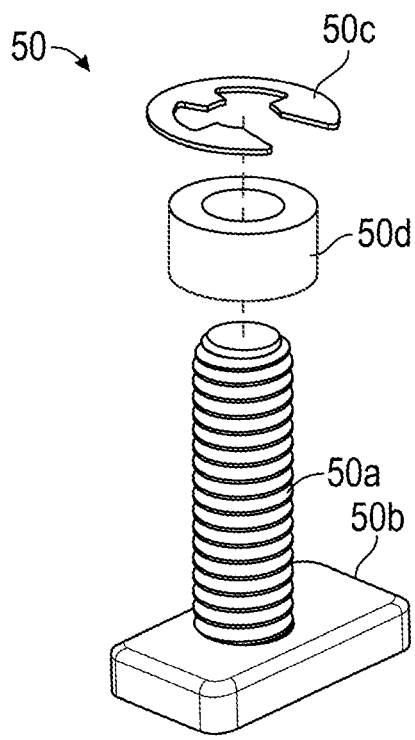
Figure 5J:
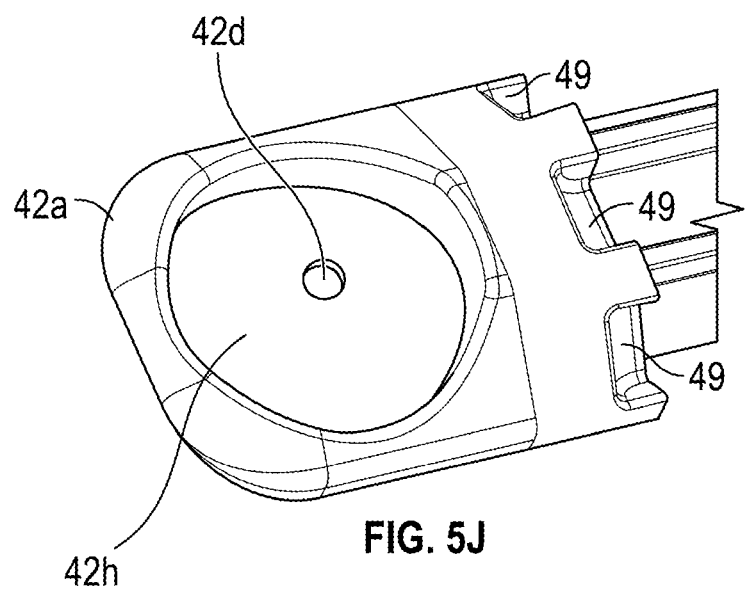
FIG. 5J illustrates a base of the interlocking assembly of FIGS. 5C-5F.
Figure 5K:
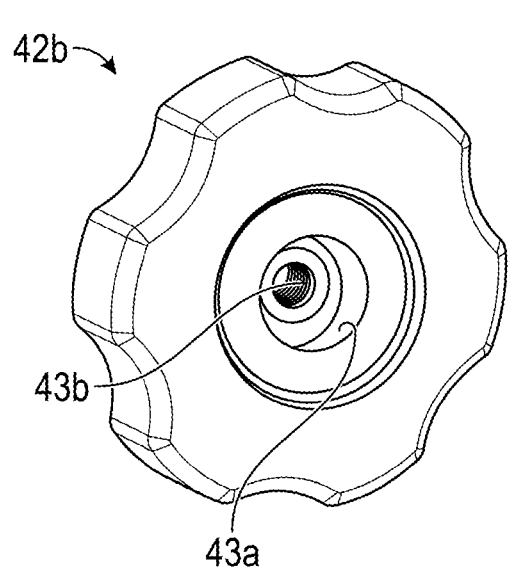
FIG. 5K illustrates a top perspective view of an actuator of the interlocking assembly of FIGS. 5C-5F.
Figure 5L:
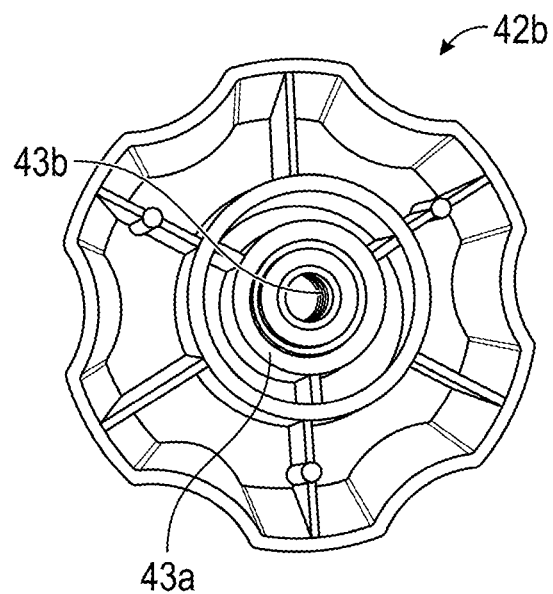
FIG. 5L illustrates a bottom perspective view of the actuator of FIG. 5K.
Figure 5M:
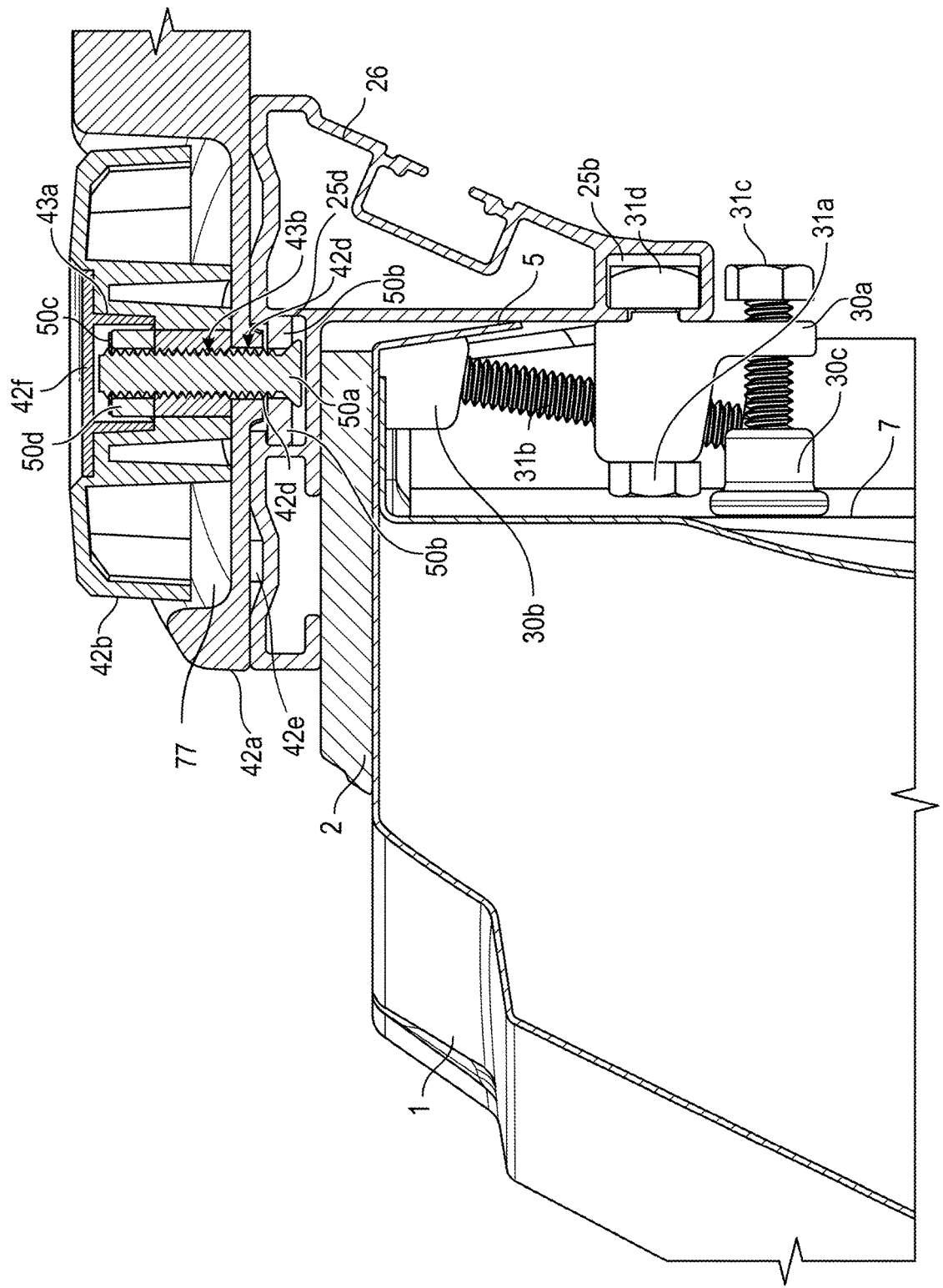
FIG. 5M illustrates a cross-sectional view through the rack assembly and truck bed as shown in FIG. 1.

With reference to FIGS. 5C-5F and 5J-5L, interlocking assembly 42 can include a base 42a, an actuator 42b, and an interlocking portion 50 that can allow base 42a and actuator 42b secure to one another. As will be discussed more below, interlocking portion 50 can additionally allow interlocking assembly 42, and in turn, cross rail 22, to secure to a mounting station on side rail 24 (for example, at an opening 32 one side rail 24). With reference to FIG. 5J, base 42a can include a cavity or recess 42h that is sized and/or shaped to receive a portion of actuator 42b. Cavity 42h can include a hole 42d. FIG. 5K illustrates a top perspective view of actuator 42b while FIG. 5L illustrates a bottom perspective view of actuator 42b. Actuator 42b can include grips along an exterior perimeter thereof which can be sized and/or shaped to allow gripping of a finger. Such shape can allow actuator 42b to be more easily rotated, the purposes of which are discussed further below. Actuator 42b can include an interior chamber 43a and a hole 43b which can be threaded. Actuator 42b can be positioned within (e.g., partially within) cavity 42h of base 42a such that a top surface of actuator 42b (for example, the surface showing in FIG. 5K) faces away from base 42a. Additionally, when positioned in such manner, hole 43b can align with hole 42d. FIGS. 5C-5D illustrate a cap 42f that can be placed overtop the interior chamber 43a of actuator 42b. Cap 42f is also shown in the cross-sectional view of FIG. 5M.

FIGS. 5G-5I illustrate an interlocking portion 50. Interlocking portion 50 can include a fastener 50a, a lock head 50b, a compression member 50d, and a locking ring 50c. Lock head 50b can be secured (for example, threadingly secured) to fastener 50a at an end of fastener 50a, as shown, or in another location along a length of the fastener 50a. For example, lock head 50b can include a through hole that is threaded and configured to secure to threads of fastener 50a. Compression member 50d can have an annular shape and can have a through-hole sized and/or shaped to receive fastener 50a. Locking ring 50c can have a circular outer perimeter and an inner cutout or opening that is sized and/or shaped to receive the fastener 50a. In some embodiments, the locking ring 50c can be moved along a length of the fastener 50a only via rotation (for example, along threads of fastener 50a), which can advantageously prevent the locking ring 50c from being pushed off the fastener 50a when a force is applied in a direction transverse (e.g., perpendicular) to a plane of the ring 50c. With reference to FIGS. 5I-5L, fastener 50a can be inserted through hole 42d of base 42a and hole 43b of actuator 42b when actuator 42b is at least partially positioned within cavity 42h of base 42a. In some embodiments, hole 43b of actuator 42b is threaded. In such embodiments, fastener 50a can be inserted through hole 43b by rotating the threads of fastener 50a with respect to the threads of hole 43b, which in turn results in the fastener 50a moving farther through (for example, upward) through hole 42d, hole 43b, and interior chamber 43a. Thereafter, compression member 50d can be placed on the fastener 502 such that compression member 50d contacts a bottom surface of an interior of chamber 43a of actuator 42b. Subsequently, locking ring 50c can be secured (for example, rotatably threaded) onto fastener 50a until locking ring 50c is positioned on a surface (e.g., top surface) of compression member 50d. In such configuration, as actuator 42b is rotated in a first direction, threads of hole 43b engage threads of fastener 50a such that lock head 50b is moved closer to a bottom surface of base 42a (see FIG. 5E). Eventually, a bottom surface of the interior chamber 43a will press against the compression member 50d which will in turn press against locking ring 50c so as to prevent further movement of the fastener 50a and lock head 50b upward. At this stage, rotation of actuator 42a can cause rotation of lock head 50b. Such rotation of lock head 50b via actuator 42a can allow a user to position lock head 50b so as to insert lock head 50b within opening 32. For example, where openings 32 are rectangular shaped and oriented diagonally with respect to a length of side main body 26 of side rail 24 as shown in FIG. 4B, lock head 50b of interlocking portion 50 can be rotated (via actuator 42b) to align with opening 32 such that lock head 50b can be inserted through opening 32 into channel 25d of main body 26.

In some embodiments, fastener 50a is a cam shaft that does not have threads but rather, a cam that protrudes radially outward from the cam shaft. Additionally, in some embodiments, hole 43b of the interior chamber 43a is not threaded and interior chamber 43a comprises an inclined slot or cam that extends radially around a height of the interior chamber 43 that is sized and/or shaped to receive the radially protruding cam follower of the cam shaft of fastener 50a. Further, an end of the cam shaft can be connected to a remainder of the actuator 42b such that rotation of the actuator 42b in turn rotates the cam shaft. Such rotation of the cam shaft can cause movement of the radially protruding cam follower within the inclined slot defined by the interior chamber 43a such that lock head 50b is moved closer to the bottom surface of the base 42a similar to that discussed above. Eventually, a bottom surface of the interior chamber 43a will press against the compression member 50d (which can be positioned around the cam shaft) which will in turn press against locking ring 50*c* (which can also be positioned around the cam shaft). This can in turn prevent further movement of the cam shaft and locking head 50*b* upward. The cam shaft, radially protruding cam follower, inclined slot or cam in the interior chamber 43*a* can be sized, shaped, and/or otherwise configured to allow rotation of a certain angular range to cause the locking head 50*b* to move between a first position where it is spaced from the bottom surface of base 42*b* to a second position where it is in contact with the bottom surface of base 42*b*. For example, such amount could be a quarter turn, a half turn, or a full turn of the actuator 40. As another example, such degree could be 45°, 90°, 180°, or 360°.

With reference to FIGS. 4B and FIGS. 5G-5I, lock head 50*b* can be sized and/or shaped to match a size and/or shape of openings 32. While FIG. 4B and FIGS. 5G-5I, illustrate a rectangular shaped opening 32 and lock head 50*b*, opening 32 and lock head 50*b* can have alternative corresponding shapes, such as square, circular, hexagonal, among others. In some configurations the compression member 50*d* is made of a resilient and/or compressible material.

FIG. 5E illustrates interlocking assembly 42 where interlocking portion 50 is secured thereto, whereas FIG. 5F illustrates interlocking assembly 42 without interlocking portion 50 secured thereto. As shown in FIG. 5F, base 42*a* can include a protruding portion proximate and/or surrounding hole 42*d*.

As shown in FIGS. 5E-5F, base 42*a* can include one or more protrusions 42*e* extending from a bottom surface of base 42*a*. The one or more protrusions 42*e* can be sized and/or shaped to fit within a recess 27*g* on the first flange 27 of main body 26 of side rail 24 (see FIG. 4G). While recess 27*g* and the protrusions 42*e* are shown as having a trapezoidal cross sections, recess 27*g* and protrusions 42*e* can have alternative cross sections, such as square, rectangular, among others.

FIG. 5M illustrates how side rail 24 can secure to a sidewall 1 of a truck bed of vehicle 10 and further illustrates how cross rail 22 can secure to a mounting station on side rail 24. As discussed previously, interlocking assembly 42 can secure to a mounting station on side rail 24, such as at any of openings 32 and channel 25*d*. As also discussed above, rotation of actuator 42*b* can in turn cause rotation of lock head 50*b*, and lock head 50*b* can be rotated in order to aid alignment and insertion into channel 25*d* through opening 32 in side rail 24. As also discussed above, openings 32 can be angled with respect to a length of side rails 24 (see FIG. 4B). In some embodiments, the opening 32 has a width or length that is equal to or greater than a width of channel 25*d* and lock head 50*b* also has a width or length that is equal to or greater than the width of channel 25*d*. In such configuration, when lock head 50*b* is inserted through opening 32 and positioned within the channel 25*d*, channel 25*d* can prevent lock head 50*b* from rotating within channel 25*d* in a certain direction and/or can allow lock head to rotate within channel 25*d* only in one rotational direction (for example, clockwise) and/or only in one rotational direction a certain amount and/or degree. For example, opening 32 can be oriented with respect to channel 25*d* such that, when lock head 50*b* is inserted through opening 32 and into channel 25*d*, one or more corners of lock head 50*b* are adjacent or proximate a wall of channel 25*d*. This can advantageously help "define" an insertion and/or removal rotational position of lock head 50*b* and interlocking assembly 42. Further, after lock head 50*b* is inserted through opening 32, lock head 50*b* can be permitted to rotate within channel 25*d* by a certain rotational amount (e.g., degree) until a "locked" position is reached. In such "locked" position, one or more corners of lock head 50*b* can be in contact with one or more walls of channel 25*d*. Further, in such "locked" position where the lock head 50*b* is not aligned with respect to the opening 32, removal of the lock head 50*b* in a direction perpendicular (for example, "upward") with respect to the side rail 24 is prevented. Thus, the orientation of the opening 32 with respect to a length of side rail 24 and/or channel 25*d* can advantageously provide guidance to a user attempting to secure interlocking assembly 42 of cross rail 22 to mounting stations along side rail 24. Opening(s) 32 in side rail 24 can be oriented at various angles with respect to a length of the side rails 24 and/or channel 25*d* (for example, an axis extending through side rail 24 and/or channel 25*c*). For example, opening 32 can be oriented with respect to an axis extending through side rail 24 and/or channel 25*c* at an angle of 5°, 10°, 15°, 20°, 25°, 30°, 35°, 40°, 45°, 50°, 55°, 60°, 65°, 70°, 75°, 80°, or 85°, or any value therebetween, or any range bounded by any combination of these values, although values outside these values or ranges can be used in some cases.

Figure 4J:
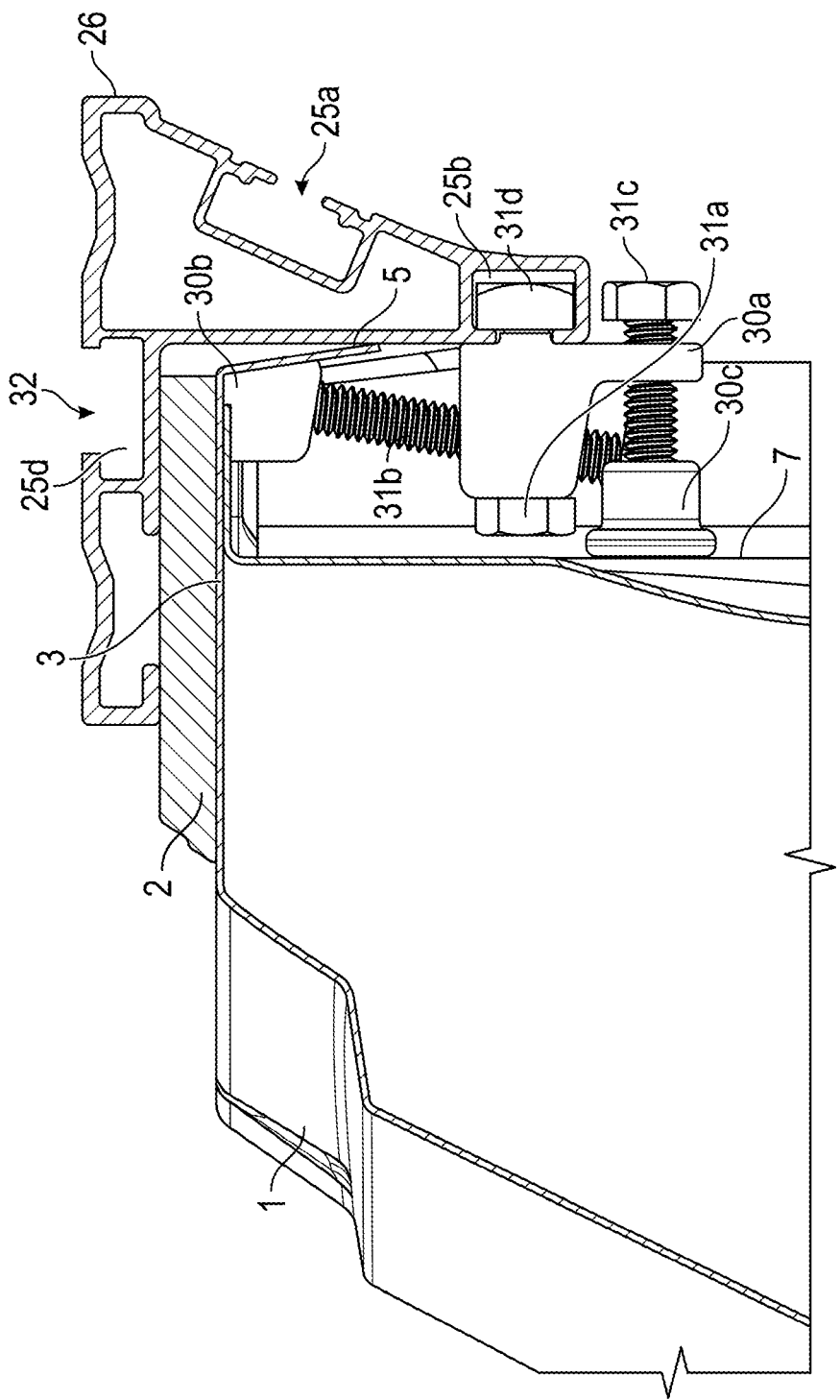
FIG. 4J illustrates a cross-sectional view of a side rail secured to a sidewall of the vehicle with a clamp mount.

FIG. 5M illustrates a cross section through the sidewall 1, cross rail 22, interlocking assembly 42, and side rail 24. FIG. 5M illustrates how side rail 24 can secure to sidewall 1 via clamp mount 30 and further illustrates how interlocking assembly 42 can secure to side rail 24. FIG. 4J illustrates how side rail 24 can secure to sidewall 1 without also showing how interlocking assembly 42 can secure to side rail 24 for simplicity.

With reference to FIG. 4J, clamp mount 30 can secure to side rail 24 via fastener head 31*d* which can be inserted into channel 25*b*. As discussed above, channel 25*b* can prevent or minimize movement of fastener head 31*d* along a direction transverse (e.g., perpendicular) to an axis extending through channel 25*b*. Additionally, clamp 30*b* can be extended (for example, via fastener 31*b*) towards a bottom corner and/or surface of lip 5 of sidewall 1 so as to apply pressure and/or force to sidewall 1. In such configuration, while side rail 24 may be secured to sidewall 1, it may be possible that side rail 24 can rotate and/or move with respect to sidewall 1 towards an interior of the truck bed (for example in a "right" direction given the orientation shown in FIG. 4J). Clamp 30*c* can advantageously be extended (via fastener 31*c*) so as to apply force and/or pressure to a side surface 7 of sidewall 1, which can resist the tendency or possibility of side rail 24 rotating in the above-described manner. As discussed above, clamps 30*b*, 30*c* can be extended and/or retracted by rotation of fasteners 31*b*, 31*c*, for example, via fastener heads thereof.

In some embodiments, the vehicle 10 includes bed rail caps 2 secured and/or positioned atop top surfaces of sidewalls 1. Such bed rail caps 2 can be plastic or metal (e.g., aluminum). Regardless of whether vehicle 10 includes sub bed rail caps 2, clamp mounts 30 can be utilized to secured side rail 24 to the sidewalls 1 such that a portion of side rail 24 (such as first flange 27) rests atop and/or places force and/or pressure on the bed rail caps 2 and/or sidewall 1.

Cross rail 22 can be secured to side rail 24 before, during, or after side rail 24 is secured to sidewall 1 of vehicle 10. As discussed previously, cross rail 22 can be secured to side rail 24 via connection between interlocking assembly 42 and a mounting station on the side rail 24. Such mounting station can be, for example, at an opening 32 along side rail 24. As discussed previously, interlocking assembly 42 can be secured to side rail 24 via insertion of lock head 50*b* through opening 32 into channel 25*c*. Further, as also discussed previously, actuator 42b can be rotated, which can in turn cause rotation of lock head 50b to a "locked" position, where channel 25d can prevent movement of lock head 50b in a direction perpendicular (e.g., "upward") with respect to a length of channel 25d.

With reference to FIGS. 5M, 5J, and 5L, in some embodiments, interlocking assembly 42 includes one or more springs positioned between portions of the bottom of actuator 42b and a bottom surface of cavity 42h of base 42a. Such springs can help bias and/or counteract jiggling and/or wobbling of the actuator 42b when mounted to base 42a in the configuration shown in FIG. 5M. Such jiggling and/or wobbling may occur due to a gap 77 that may exist between bottom surfaces or portions of actuator 42b and a surface of base 42a within cavity 42h.

Any or all of the channels 25d, 25a of the main body 26 of side rail 24 and/or channels 41a, 41b, 41c of the main body 40 of cross rail 22 can be sized and/or shaped to receive T-shaped inserts or anchors, and/or fastener heads or nuts in order to allow attachment of mounting equipment. For example, any or all of channels 25d, 25a, 41a, 41b, 41c can be sized and/or shaped to allow a fastener head to be inserted into the channels 25d, 25a, 41a, 41b, 41c along a direction that is parallel to an axis extending through a length of channels 25d, 25a, 41a, 41b, 41c. Such channels 25d, 25a, 41a, 41b, 41c can also be sized and/or shaped to prevent a fastener head (and a connected fastener) from being removed from the channels 25d, 25a, 41a, 41b, 41c along a direction that is transverse (for example, perpendicular) to an axis extending through a length of channels 25d, 25a, 41a, 41b, 41c. Any or all of channel 25d, 25a, 41a, 41b, 41c can be sized and/or shaped to allow a fastener head to be inserted into the channel 25d, 25a, 41a, 41b, 41c along a direction parallel to a length (or portion of a length) of the channel 25d, 25a, 41a, 41b, 41c and/or along a direction perpendicular to the length (or portion of the length), for example, if the fastener head is rotated before and/or after insertion into the channels 25d, 25a, 41a, 41b, 41c. Further, any or all of channel 25d, 25a, 41a, 41b, 41c can be sized and/or shaped to prevent removal out of the channel 25d, 25a, 41a, 41b, 41c after the fastener head has been inserted into and rotated (at least partially) within the channel 25d, 25a, 41a, 41b, 41c. As another example, with reference to FIG. 5B, channel 41a can be sized and/or shaped to allow insertion of a hexagonal-shaped fastener head connected to a threaded fastener along an axis extending through the channel 41a and then, once inserted, can prevent removal of the fastener head (and in turn the threaded fastener) in a direction perpendicular to such axis.

Figure 6A:
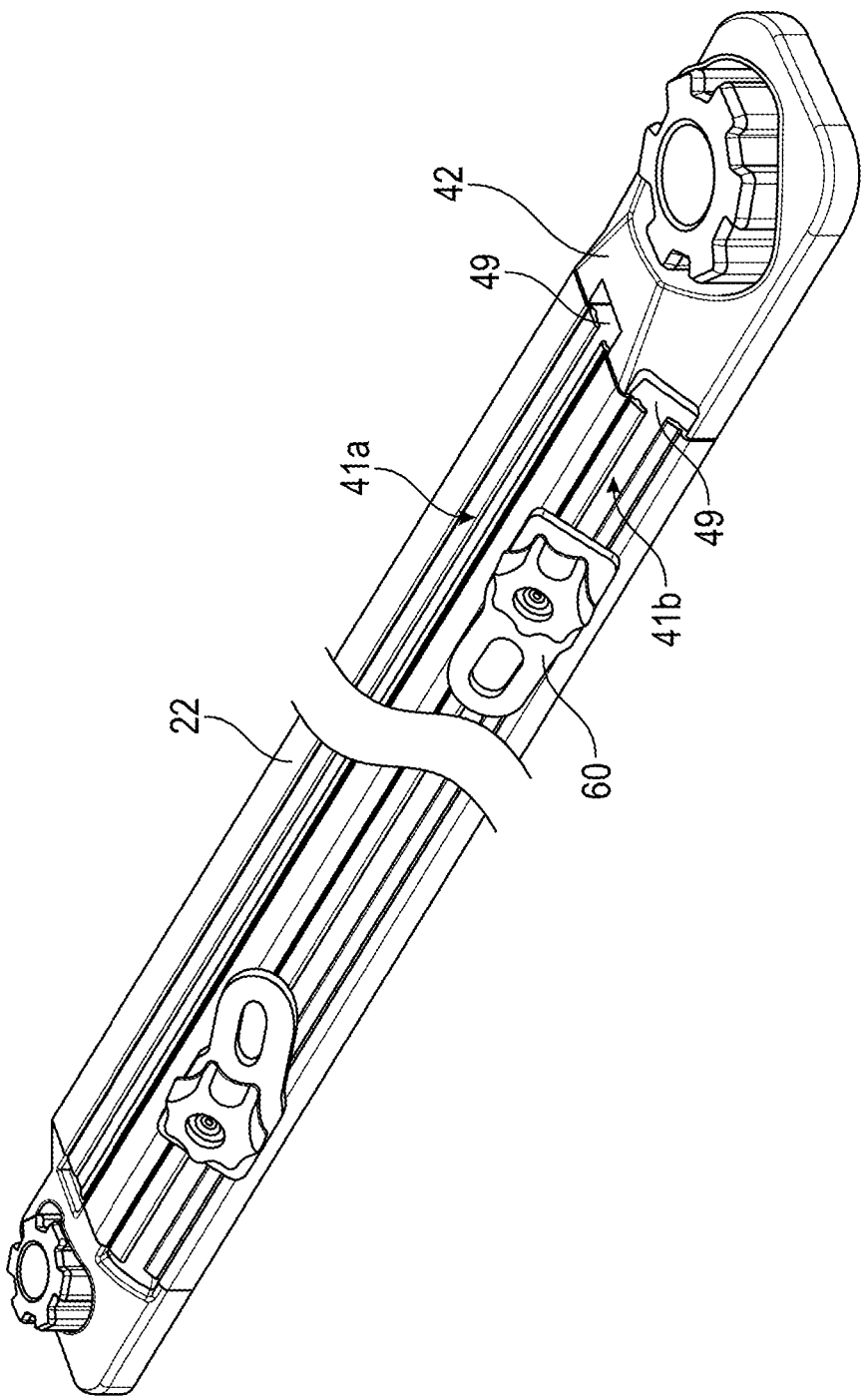
FIGS. 6A-6E illustrate views of an embodiment of a mounting anchor that can be used in conjunction with the rack assembly of the present disclosure.
Figure 6B:
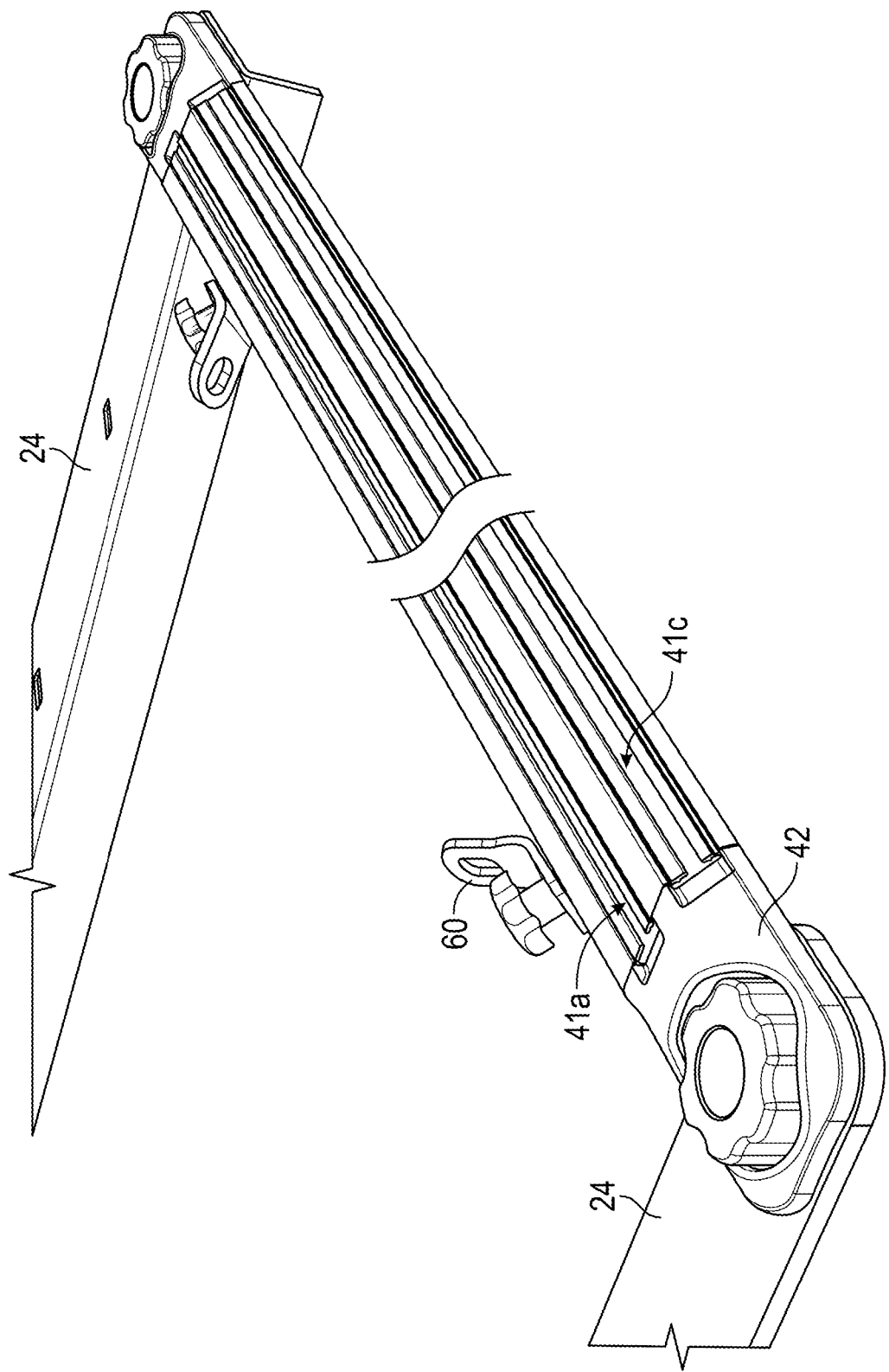
Figure 6C:
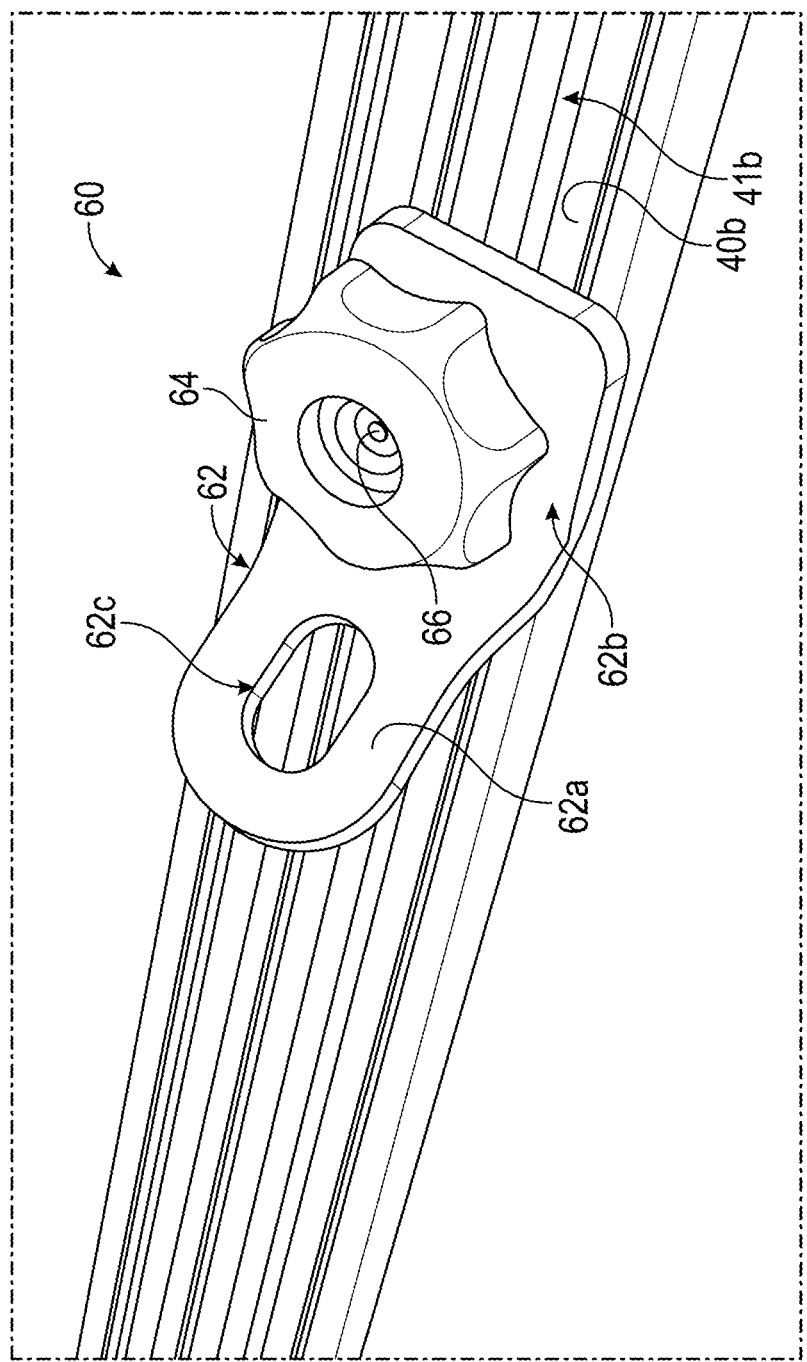
Figure 6E:
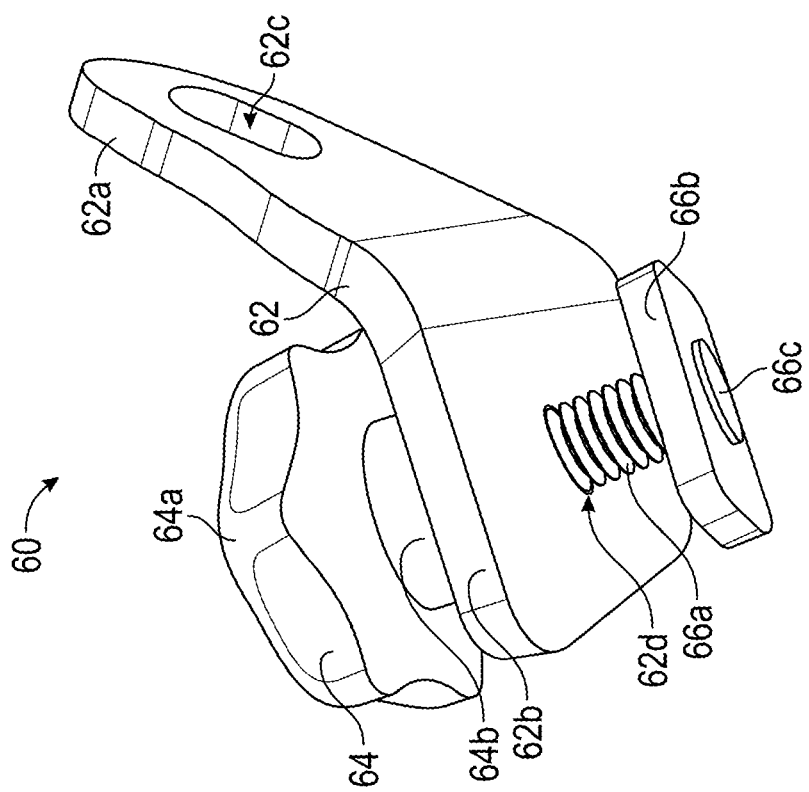
Figure 6D:
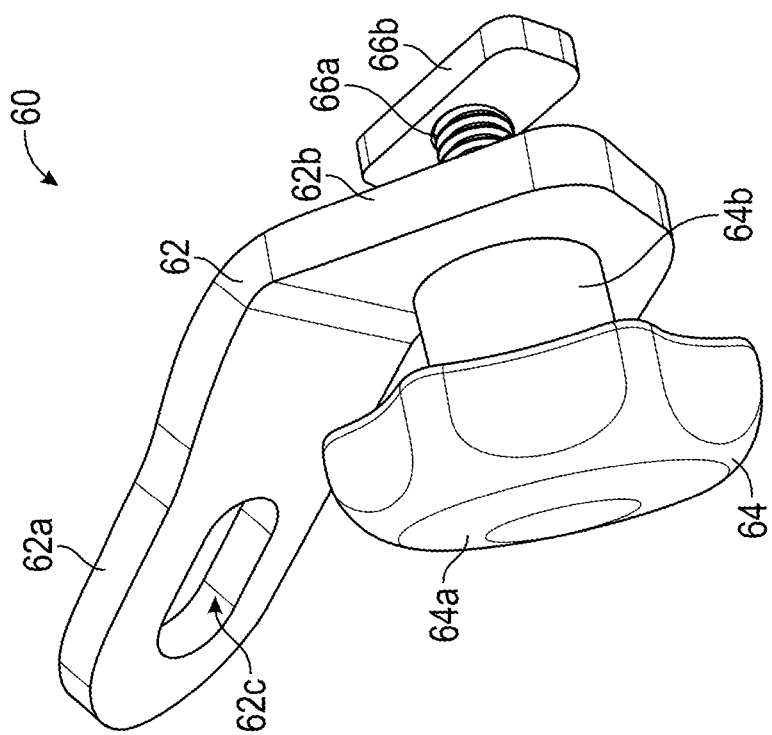

FIGS. 6A-6E illustrate various views of an embodiment of a mounting insert or anchor 60 that can be used in conjunction with the rack assembly 20. For example, the mounting anchor 60 can be inserted into and/or secured within any of channels 25d, 25a, 41a, 41b, 41c of side rail 24 and/or cross rail 22. With reference to FIG. 6C-6E, the mounting anchor 60 can include a bracket 62, an actuator 64, and an interlocking portion 66 which can couple the bracket 62 and actuator 64 to each other and/or to the channels 25d, 25a, 41a, 41b, 41c. Bracket 62 can include a first portion 62a and a second portion 62b connected to the first portion 62a. The first portion 62a and/or the second portion 62b can be flat. The first portion 62a can be angled with respect to the second portion 62b. For example, the first portion 62a can be angled at an angle of 10°, 20°, 30°, 40°, 50°, 60°, 70°, 80°, 90°, 100°, 110°, 120°, 130°, 140°, 150°, 160°, 170°, or 180°, or any value therebetween, or any range bounded by any combination of these values, although values outside these values or ranges can be used in some cases.

As shown in FIGS. 6A-6E, the first portion 62a can include an opening 62c, which can allow for attachment of equipment or gear. In some embodiments, the first portion 62a has a first end connected to the second portion 62b and a second end opposite to the first end that is rounded (see FIGS. 6C-6E). The second portion 62b can have a through-hole 62d sized and/or shaped to allow a fastener stem 66a of fastener 66 to pass therethrough. As shown in FIGS. 6C-6E, actuator 64 can include top portion 64a and a stem portion 64b (also referred to herein as "stem"). As shown, top portion 64a can include grips along an exterior perimeter thereof which can be sized and/or shaped to allow gripping of a finger to allow turning of actuator 64. The stem 64b of actuator 64 can have a threaded through-hole extending along a length of the stem 64b that is sized and/or shaped to allow fastener stem 66a to pass therethrough (for example, via threading and/or rotation). Fastener 66 can include stem 66a, a lock head 66b, and a stop 66c (see FIG. 6E). Lock head 66b can have a hole (which can be threaded or not threaded) that can be sized and/or shaped to receive stem 66a. Stop 66c can have a cross-section that is larger than the hole in lock head 66 so as to prevent lock head 66b from being removed from an end of the fastener stem 66a. Lock head 66b can be sized and/or shaped to fit within any or all of channels 25d, 25a, 41a, 41b, 41c. For example, lock head 66b can have a rectangular (see FIG. 6E), square, or other shape that can be sized and/or shaped to fit within any or all of channels 25d, 25a, 41a, 41b, 41c. When mounting anchor 60 is inserted and positioned in channel 41b as shown in FIG. 6C, rotation of top portion 64a can cause the stem 64b and second portion 62b of bracket 62 to move closer to the lock head 66b of fastener 66 until a bottom surface of the second portion 62b contacts a top surface 40b of cross rail 22 proximate channel 41b (see FIGS. 6C-6E and 5B). In such manner, actuator 64 can be "tightened" so to as prevent movement of the mounting anchor 60 along an axis extending through a length of channel 41b, which can advantageously secure the mounting anchor 60 at a desired position along cross rail 22. In contrast, actuator 64 can be "loosened" (for example, rotation in an opposite direction) so as to reduce the amount of force and/or contact area between the top surface 40b of cross rail 22 and the second portion 62b of bracket 60 to allow the mounting anchor 60 to be moved along the axis extending through the length of channel 41b. Mounting anchor 60 can be inserted and/or secured to channels 41a, 41c and surfaces 40a, 40c in a similar or identical manner.

With reference to FIG. 6A, interlocking assembly 42 can include slots 49 that can be sized and/or shaped to allow the lock head 66d of fastener 66 to be inserted (for example, slidably) within channels 41a, 41b, 41c.

From the foregoing description, it will be appreciated that an inventive rack assembly for a truck bed is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A rack assembly configured to be mounted to sidewalls of a truck bed of a vehicle, the rack assembly comprising:
    a first side rail configured to be secured to a first sidewall of the truck bed, the first side rail comprising:
        a first end, a second end, and a length extending between the first and second ends;
        a first flange configured to be positioned above a top surface of the first sidewall when the first side rail is secured to the first sidewall; and
        a second flange extending substantially perpendicular relative to the first flange and configured to extend towards a bed surface of the truck bed when the first side rail is secured to the first sidewall, wherein the second flange comprises a channel extending along the length of the first side rail, the channel comprising an opening that faces at least partially toward an interior surface of the first sidewall;
    a first clamp mount configured to secure the first side rail to the first sidewall of the truck bed, the first clamp mount comprising:
        a first clamp portion configured to engage at least one of an underside of a top portion of the first sidewall and a lip of the first sidewall when the first clamp mount is in a clamped state;
        a second clamp portion configured to engage said interior surface of the first sidewall when the first clamp mount is in said clamped state; and
        a third clamp portion configured to be received within the channel of the second flange of the first side rail to secure the first clamp mount to the first side rail, wherein said third clamp portion is moveable along a length of the channel of the second flange when the first clamp mount is in an unclamped state to allow a position of the first clamp mount relative to the first sidewall to be adjusted;
    a second side rail configured to be secured to a second sidewall of the truck bed, the second side rail comprising:
        a first end, a second end, and a length extending between the first and second ends of the second side rail;
        a first flange configured to be positioned above a top surface of the second sidewall when the second side rail is secured to the second sidewall; and
        a second flange extending substantially perpendicular relative to the first flange of the second side rail and configured to extend towards the bed surface of the truck bed when the second side rail is secured to the second sidewall, wherein the second flange of the second side rail comprises a channel extending along the length of the second side rail, the channel comprising an opening that faces at least partially toward an interior surface of the second sidewall;

a second clamp mount configured to secure the second side rail to the second sidewall of the truck bed, the second clamp mount comprising:
a first clamp portion configured to engage at least one of an underside of a top portion of the second sidewall and a lip of the second sidewall when the second clamp mount is in a clamped state;
a second clamp portion configured to engage said interior surface of the second sidewall when the second clamp mount is in said clamped state; and
a third clamp portion configured to be received within the channel of the second flange of the second side rail to secure the second clamp mount to the second side rail, wherein said third clamp portion is moveable along a length of the channel of the second flange of the second side rail when the second clamp mount is in an unclamped state to allow a position of the second clamp mount relative to the second sidewall to be adjusted; and
at least one cross rail configured to extend across the truck bed of the vehicle, the at least one cross rail comprising:
a first end configured to be secured to each of a plurality of mounting stations of the first side rail; and
a second end configured to be secured to each of a plurality of mounting stations of the second side rail.

2. The rack assembly of claim 1, wherein:
the channel of the second flange of the first side rail is configured to allow the third clamp portion of the first clamp mount to move in a first direction along the length of the channel and further configured to inhibit the third clamp portion of the first clamp mount from exiting the channel by moving in a second direction that is substantially perpendicular to said first direction; and
the channel of the second flange of the second side rail is configured to allow the third clamp portion of the second clamp mount to move in a third direction along the length of the channel and further configured to inhibit the third clamp portion of the second clamp mount from exiting the channel by moving in a fourth direction that is substantially perpendicular to said third direction.

3. The rack assembly of claim 1, wherein:
the first clamp portion of the first clamp mount is configured to engage both of the underside of the top portion of the first sidewall and the lip of the first sidewall when the first clamp mount is in the clamped state; and
the first clamp portion of the second clamp mount is configured to engage both of the underside of the top portion of the second sidewall and the lip of the second sidewall when the second clamp mount is in the clamped state.

4. The rack assembly of claim 1, wherein:
the channel of the second flange of the first side rail is a first channel of the second flange of the first side rail, the second flange of the first side rail further comprising a second channel extending along at least a portion of the length of the first side rail on a different side of the first side rail than the first channel;
the channel of the second flange of the second side rail is a first channel of the second flange of the second side rail, the second flange of the second side rail further comprising a second channel extending along at least a portion of the length of the second side rail on a different side of the second side rail than the first channel; and
each of the second channels of the first and second side rails is configured to receive an anchor for mounting equipment.

5. The rack assembly of claim 4, further comprising:
a first pair of end caps configured to be secured to the first and second ends of the first side rail, wherein each of the first pair of end caps comprises a channel configured to substantially align with the second channel of the first side rail; and
a second pair of end caps configured to be secured to the first and second ends of the second side rail, wherein each of the second pair of end caps comprises a channel configured to substantially align with the second channel of the second side rail.

6. The rack assembly of claim 1, wherein:
each of said first and second clamp mounts comprises a body portion, a first fastener that threadingly couples the first clamp portion to the body portion, and a second fastener that threadingly couples the second clamp portion to the body portion; and
each of the first and second clamp mounts are configured to be transitioned to said clamped state by rotating the first and second fasteners relative to the body portion.

7. A rack assembly configured to be mounted to sidewalls of a truck bed of a vehicle, the rack assembly comprising:
a pair of side rails configured to be secured to the sidewalls of the truck bed, each of the pair of side rails comprising:
a first end, a second end, and a length extending between the first and second ends;
a first flange configured to be positioned above a top surface of one of the sidewalls; and
a second flange extending transverse relative to the first flange, wherein the second flange comprises a channel extending along at least a portion of said length;
a plurality of clamp mounts configured to secure the pair of side rails to the sidewalls of the truck bed, each clamp mount comprising:
a first clamp portion configured to engage a first portion of one of the sidewalls;
a second clamp portion configured to engage a second portion of said one of the sidewalls; and
a third clamp portion configured to be received within the channel of the second flange of one of the pair of side rails, wherein said third clamp portion is moveable along at least a portion of a length of the channel when the clamp mount is in an unclamped state to allow a position of the clamp mount relative to said one of the sidewalls to be adjusted; and
at least one cross rail configured to extend across the truck bed of the vehicle, the at least one cross rail comprising:
a first end configured to be secured to one or more portions of one of the pair of side rails; and
a second end configured to be secured to one or more portions of the other one of the pair of side rails.

8. The rack assembly of claim 7, wherein:
said first portion of said one of the sidewalls comprises at least one of an underside of a top portion of said one of the sidewalls and a lip of said one of the sidewalls; and
said second portion of said one of the sidewalls comprises an interior surface of said one of the sidewalls.

9. The rack assembly of claim 7, wherein said channel is configured to allow the third clamp portion to move in a first direction along said at least the portion of the length and further configured to inhibit the third clamp portion from exiting the channel by moving in a second direction that is substantially perpendicular to said first direction.

10. The rack assembly of claim 7, wherein:
each clamp mount is configured to be transitioned between said unclamped state in which movement of said third clamp portion along said at least the portion of the length of the channel is permitted and a clamped state in which said movement is inhibited;
each clamp mount comprises a body portion, a first fastener that couples the first clamp portion to the body portion, and a second fastener that couples the second clamp portion to the body portion; and
each clamp mount is configured to be transitioned from said unclamped state to said clamped state by moving a position of each of the first and second clamp portions relative to the body portion.

11. The rack assembly of claim 7, wherein:
said channel is a first channel of the second flange;
the second flange comprises a second channel extending along at least a portion of said length on a different side of each of the pair of side rails than the first channel; and
the second channel is configured to receive an anchor for mounting equipment.

12. The rack assembly of claim 11, further comprising:
a first pair of end caps configured to be secured to the first and second ends of one of the pair of side rails, each of the first pair of end caps comprising a channel configured to substantially align with the second channel of said one of the pair of side rails; and
a second pair of end caps configured to be secured to the first and second ends of the other one of the pair of side rails, each of the second pair of end caps comprising a channel configured to substantially align with the second channel of said other one of the pair of side rails.

13. A rack assembly configured to be mounted to sidewalls of a truck bed of a vehicle, the rack assembly comprising:
a pair of side rails configured to be secured to the sidewalls of the truck bed, each of the pair of side rails comprising:
a first end, a second end, and a length extending between the first and second ends;
a first flange configured to be positioned above a top surface of one of the sidewalls; and
a second flange extending transverse relative to the first flange, wherein the second flange comprises a channel extending along at least a portion of said length;
a plurality of clamp mounts configured to secure the pair of side rails to the sidewalls of the truck bed, each clamp mount comprising:
a first clamp portion configured to engage one of the sidewalls; and
a second clamp portion configured to be received within the channel of the second flange of one of the pair of side rails, wherein said second clamp portion is moveable along at least a portion of a length of the channel when the clamp mount is in an unclamped state to allow a position of the clamp mount relative to said one of the sidewalls to be adjusted; and
at least one cross rail configured to be secured to the pair of side rails.

14. The rack assembly of claim 13, wherein:
each of the plurality of clamp mounts further comprises a third clamp portion; and
the first clamp portion is configured to engage a first portion of said one of the sidewalls and the third clamp portion is configured to engage a second portion of said one of the sidewalls.

15. The rack assembly of claim 14, wherein:
said first portion of said one of the sidewalls comprises at least one of an underside of a top portion of said one of the sidewalls and a lip of said one of the sidewalls; and
said second portion of said one of the sidewalls comprises an interior surface said one of the sidewalls.

16. The rack assembly of claim 13, wherein said channel is configured to allow the second clamp portion to move in a first direction along said at least the portion of the length and further configured to inhibit the second clamp portion from exiting the channel by moving in a second direction that is substantially perpendicular to said first direction.

17. The rack assembly of claim 13, wherein each clamp mount is configured to be transitioned between said unclamped state in which movement of said second clamp portion along said at least the portion of the length of the channel is permitted and a clamped state in which said movement is inhibited.

18. The rack assembly of claim 17, wherein:
each clamp mount comprises a body portion, a first fastener that couples the first clamp portion to the body portion, and a second fastener that couples the third clamp portion to the body portion; and
each clamp mount is configured to be transitioned from said unclamped state to said clamped state by moving a position of each of the first and third clamp portions relative to the body portion.

19. The rack assembly of claim 13, wherein:
said channel is a first channel of the second flange;
the second flange comprises a second channel extending along at least a portion of said length on a different side of each of the pair of side rails than the first channel; and
the second channel is configured to receive an anchor for mounting equipment.

20. The rack assembly of claim 19, further comprising:
a first pair of end caps configured to be secured to the first and second ends of one of the pair of side rails, each of the first pair of end caps comprising a channel configured to substantially align with the second channel of said one of the pair of side rails; and
a second pair of end caps configured to be secured to the first and second ends of the other one of the pair of side rails, each of the second pair of end caps comprising a channel configured to substantially align with the second channel of said other one of the pair of side rails.

* * * * *